United States Patent
Wan et al.

(10) Patent No.: US 8,230,181 B2
(45) Date of Patent: *Jul. 24, 2012

(54) MULTIPROCESSOR COMPUTING SYSTEM WITH MULTI-MODE MEMORY CONSISTENCY PROTECTION

(75) Inventors: Kit M. Wan, Manchester (GB); Gisle Dankel, Salford (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/178,839

(22) Filed: Jul. 8, 2011

(65) Prior Publication Data

US 2011/0264867 A1   Oct. 27, 2011

Related U.S. Application Data

(63) Continuation of application No. 12/369,484, filed on Feb. 11, 2009, now Pat. No. 7,996,629.

(30) Foreign Application Priority Data

Feb. 14, 2008   (GB) .................................. 0802709.6

(51) Int. Cl.
*G06F 13/00* (2006.01)
(52) U.S. Cl. .................... 711/147; 711/154; 711/167

(58) Field of Classification Search .................. 711/147, 711/154, 167
See application file for complete search history.

(56) References Cited

U.S. PATENT DOCUMENTS

| | | | |
|---|---|---|---|
| 5,890,189 A | 3/1999 | Nozue et al. | |
| 2007/0143580 A1* | 6/2007 | Musoll et al. | 712/205 |
| 2009/0198938 A1 | 8/2009 | Arimilli et al. | |

* cited by examiner

*Primary Examiner* — Reba I Elmore
(74) *Attorney, Agent, or Firm* — James L. Baudino; Matthew B. Talpis

(57) ABSTRACT

Disclosed are a method and apparatus for protecting memory consistency in a multiprocessor computing system, relating to program code conversion such as dynamic binary translation. The exemplary multiprocessor computing system provides memory and multiple processors, and a set of controller/translator units TX1, TX2, TX3 arranged to convert respective application programs into program threads T1, T2, etc., which are executed by the processors. Each controller/translator unit sets a first mode where a single thread T1 executes on a single processor P1, orders a second mode for two or more threads T1, T2 that are forced to execute one at a time on a single processor P2 such as by setting affinity with that processor, and orders a third mode to selectively apply active memory consistency protection in relation to accesses to explicit or implicit shared memory while allowing the multiple threads T1, T2, T3, T4 to execute on the multiple processors.

29 Claims, 17 Drawing Sheets

MULTIPROCESSOR COMPUTING SYSTEM WITH MULTI-MODE MEMORY CONSISTENCY PROTECTION

BACKGROUND OF THE INVENTION

1. Field of the Invention

The present invention relates generally to the field of computers and computer systems. More particularly, the present invention relates to the protection of memory consistency in a multiprocessor computing system.

2. Description of the Related Art

Modern needs for high-powered computing systems have resulted in the development of multiprocessor computer architectures having two, four, eight or more separate processors. Such multiprocessor systems are able to execute multiple portions of program code simultaneously, typically in the form of multiple processes and/or multiple process threads. Further, most modern multiprocessor computing systems support shared memory that is accessible by two or more code portions (e.g. processes or threads) running on separate processors.

It is important that any changes to the data stored in the shared memory are made visible to each of the multiple code portions in an orderly and synchronised manner. Hence, each different type of multiprocessor system has its own corresponding memory consistency model that specifies the semantics of memory operations (particularly relating to load, store and atomic operations) that thereby defines the way in which changes to shared memory are made visible in each of the multiple processors. The program code and the hardware in the multiprocessor system should both adhere to the memory consistency model in order to achieve correct operation. Conversely, a memory consistency failure may lead to a fatal crash of the system.

A more detailed introduction to memory consistency models in multiprocessor computing systems is provided in "Shared Memory Consistency Models: A Tutorial" by Sarita V. Advey and Kourosh Gharachorlooz, published as Rice University ECE Technical Report 9512 and Western Research Laboratory Research Report 95/7 dated September 1995, the disclosure which is incorporated herein by reference.

In the simplest example, the memory consistency model specifies sequential consistency whereby the memory operations appear to take place strictly in program order as specified in the program code. However, the processors and memory subsystems in a multiprocessor architecture are often designed to reorder memory operations to achieve improved hardware performance. That is, many modern shared-memory multiprocessor systems such as Digital ALPHA, SPARC v8 & v9 and IBM POWER and others provide various forms of relaxed ordering and offer subtly different forms of non-sequential memory consistency. Here, further general background information in the field of memory consistency is provided in an article entitled "POWER4 and shared memory synchronisation" by B. Hay and G. Hook at http://www-128.ibm.com/developerworks/eserver/articles/power4_mem.html of 24 Apr. 2002, the disclosure of which is incorporated herein by reference.

This memory consistency issue becomes particularly acute in the field of program code conversion, and especially so in relation to dynamic binary translation. Here, program code written or compiled specifically to run on a first type of multiprocessor computer architecture (here called the subject architecture) is translated and executed instead on a second type of multiprocessor computer architecture (the target). For example, binary code for the SPARC v9 subject architecture is dynamically translated and executed as binary code on a POWER target architecture. However, the memory consistency model of the target architecture often deviates from the model of the subject architecture. In particular, memory consistency errors arise when converting program code from a subject architecture having a strongly-ordered memory consistency model (such as SPARC and x86 architectures) to a target architecture having a memory consistency model with relatively weak ordering (such as in PowerPC and Itanium architectures).

An aim of at least some exemplary embodiments of the present invention is to provide a multiprocessor computer system in which memory consistency errors are reduced. Another aim of at least some exemplary embodiments of the present invention is to provide a multiprocessor computer system in which memory consistency errors are reduced when executing code produced by automatic program code conversion such as dynamic binary translation.

SUMMARY OF THE INVENTION

According to the present invention there is provided a multiprocessor computer system and a method to protect memory consistency in a multiprocessor computer system, as set forth in the claims appended hereto. Other, optional, features of the invention will be apparent from the dependent claims and the description which follows.

The example embodiments of the present invention discussed herein concern the protection of memory consistency in a multiprocessor computing system. In particular, the exemplary embodiments of the present invention concern a mechanism to provide consistent and synchronised operations in relation to shared memory in a multiprocessor computer system.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In one exemplary aspect of the present invention there is provided a multiprocessor computing system, comprising: a memory storing a program that is divisible into a plurality of program threads; a plurality of processors arranged to execute the program stored in the memory; a controller arranged to control execution of the program by the plurality of processors; an affinity unit arranged to restrict the plurality of program threads to execute one at a time on a selected one of the plurality of processors according to the default memory consistency model of the computing system; a load monitor arranged to monitor loading of the selected one of the plurality of processors and to alert the controller when loading of the selected one processor exceeds a predetermined threshold; and a memory consistency protection unit arranged, in response to the alert from the load monitor, to selectively intervene to apply active memory consistency protection to the plurality of program threads according to a second memory consistency model and to free the plurality of program threads to execute simultaneously on any two or more of the plurality of processors.

In one aspect, the affinity unit is arranged to set affinity of each of the program threads to execute together on the single selected one of the plurality of processors.

In one aspect, the controller adjusts the system between at least a first mode, a second mode and a third mode in response to execution behaviour of the program, wherein: in the first mode, the program is divided into a single program thread and is executed on a one of the plurality of processors; in the second mode, the program is divided into the plurality of program threads and the affinity unit sets affinity to execute each of the program threads together on a single selected one of the plurality of processors; and in the third mode, the program is divided into the plurality of program threads which are executed on any two or more of the plurality of processors while the memory consistency protection unit selectively applies the active memory consistency protection.

In one aspect, the controller escalates the system from the first mode to the second mode in response to a division of the program from the single program thread into two or more program threads.

In one aspect, the controller escalates the system from the second mode to the third mode in response to the alert from the load monitor. Here, in one aspect, the controller determines whether to continue in the second mode or to selectively enter the third mode, in response to the alert signal from the load monitor.

In one aspect, the active memory consistency protection regenerates at least selected portions of the program thread to include synchronisation instructions. In another aspect, the active memory consistency protection regenerates at least selected portions of the program thread to force selected store-ordered pages in the memory.

In one aspect, the system further comprises an address space allocation unit arranged to divide a virtual address space used to address the memory into a plurality of virtual address space regions and to control execution of the plurality of program threads to access the memory though the plurality of virtual address space regions initially according to a first memory consistency model; and a shared memory detection unit arranged to detect a memory access request made in execution of a first of the program threads with respect to a shared memory area in the memory which is also accessible or will become accessible by at least a second of the program threads and to identify at least one group of instructions in the first program thread which access the shared memory area; and wherein the memory consistency protection unit is arranged to selectively apply the active memory consistency protection to enforce a second memory consistency model in relation to accesses to the shared memory area in execution of the identified group of instructions in the first program thread, responsive to the shared memory detection unit identifying the identified group of instructions.

In one aspect, the controller unit is arranged to generate the first and second program threads to execute under the first memory consistency model for ordering accesses to the memory; and the memory consistency protection unit is arranged to selectively apply the active memory consistency protection whereby the identified group of instructions in the first program thread execute under the second memory consistency model when accessing the shared memory area.

In one aspect, the first memory consistency model is a default memory consistency model of the multiprocessor computing system. In one aspect, the second memory consistency model has stronger memory access ordering constraints compared with the first memory consistency model.

In one aspect, the controller unit is arranged to translate the program into the plurality of program threads.

In one aspect, the controller is arranged to dynamically convert the program into the plurality of program threads as the program is run.

In one aspect, the program is binary program code executable by a subject computing architecture and the controller performs dynamic binary translation to convert the program into binary code which is then executed by the plurality of processors.

In one aspect, the shared memory detection unit is arranged to detect a request for an explicitly shared memory area by intercepting a memory mapping system call made by said first program thread during execution on a respective processor of the plurality of processors, where the memory mapping system call explicitly requests a mapping of a shared memory area; and the shared memory detection unit is further arranged to map the requested explicitly shared memory area into a shared virtual address space region amongst the plurality of virtual address space regions, and to return a pointer within a private virtual address space region of the virtual address space regions allocated to the first program thread to represent the explicitly shared memory area.

In one aspect, an exception handler is arranged to receive an exception signal generated in response to a faulting memory access within an instruction in said first program thread which attempts to access an area which is not mapped within the respective virtual address space region; the shared memory detection unit is arranged to determine that the faulting memory access is an attempt to access the explicitly shared memory area mapped into the shared virtual address space region; the address space allocation unit is arranged to direct the identified group of instructions to access the explicitly shared memory area with respect to the shared virtual address space region; and the memory consistency protection unit is arranged to selectively apply the memory consistency protection in relation to access to the detected explicitly shared memory area by execution of the identified group of instructions.

In one aspect, the shared memory detection unit is arranged to detect implicit sharing of a private memory area by intercepting a clone-type system call made by said first program thread during execution on a respective processor, where the clone-type system call requests the initiation of execution of the second program thread cloned from execution of the first program thread; and the address space allocation unit is arranged to allocate a second virtual address space region to the second program thread which is distinct from a first virtual address space region allocated to the first program thread.

In one aspect, an exception handler is arranged to receive an exception signal generated in response to a faulting memory access within an instruction in said second program thread which attempts to access an area which is not mapped within the respective second virtual address space region; the shared memory detection unit is arranged to determine in response to said exception signal that the faulting memory access is an attempt to access the private memory area mapped into the first virtual address space region of the first program thread, to unmap the private memory area from the first virtual address space region and to map the private memory area into a shared virtual address space region as an implicitly shared memory area; the address space allocation unit is arranged to direct the identified group of instructions in the second program thread to access the implicitly shared memory area with respect to the shared virtual address space region; and the memory consistency protection unit is arranged to selectively apply memory consistency protection in relation to access to the implicitly shared memory area by the identified group of instructions.

In one aspect, the exception handler is arranged to receive an exception signal generated in response to a faulting memory access within an instruction in said first program thread which attempts to access an area which is not mapped within the respective first virtual address space region; the shared memory detection unit is arranged to determine in response to said exception signal that the faulting memory access is an attempt to access the implicitly shared memory area mapped into the shared virtual address space region; the address space allocation unit is arranged to direct the identified group of instructions in the first program thread to access the implicitly shared memory area with respect to the shared virtual address space region; and the memory consistency protection unit is arranged to selectively apply the memory consistency protection in relation to access to the implicitly shared memory area by the identified group of instructions.

In one aspect, an exception handler is arranged to receive an exception signal generated in response to a faulting memory access within an instruction in the first program thread which attempts to access an area which is not mapped within a first one of said virtual address space regions; and the shared memory detection unit is arranged to determine in response to said exception signal that the faulting memory access is an attempt to access a memory area that is mapped into a second of the virtual address space regions relating to the second program thread, and to map the memory area into a shared virtual address space region as a shared memory area; the address space allocation unit is arranged to direct the identified group of instructions in the first program thread to access the shared memory area with respect to the shared virtual address space region; and the memory consistency protection unit is arranged to selectively apply memory consistency protection in relation to access to the shared memory area by the identified group of instructions.

In one aspect, the exception handler is arranged to receive an exception signal generated in response to a faulting memory access within an instruction in said first program thread which attempts to access an area which is not mapped within the shared virtual address space region; the shared memory detection unit is arranged to determine in response to said exception signal that the faulting memory access is an attempt to access a private memory area in relation to the first virtual address space region; the address space allocation unit is arranged to redirect the identified group of instructions in the first program thread to access the private memory area with respect to the first virtual address space region; and the memory consistency protection unit is arranged to selectively remove memory consistency protection in relation to access to the private memory area by the identified group of instructions.

In one aspect, each of the plurality of program threads is divided into blocks of instructions where a block is a minimum code unit handled by the controller unit; the memory consistency protection unit is arranged to cause execution of one or more remainder instructions of a current block to complete whilst applying memory consistency protection to the remainder instructions when an exception signal is generated part way though execution of the current block; and the controller unit is arranged to regenerate the current block to apply memory consistency protection throughout the block.

In one aspect, the memory consistency protection unit is arranged to cause execution of a current block to complete whilst applying memory consistency protection, and then mark the block as requiring regeneration; and the controller unit is arranged to regenerate the block in response to the mark.

In one aspect, the controller unit is arranged to generate the first and second target threads including null operations at selected synchronisation points and the memory consistency protection unit is arranged to modify at least the remainder instructions of the block to insert serialisation instructions in substitution for the null operations.

In one aspect, the memory consistency protection unit is arranged to obtain a subject state associated with a checkpoint in the block, where the subject state represents a state of execution of a subject code from which the target threads are derived, and the controller unit further comprises a subject-to-target interpreter arranged to interpret instructions in the subject code into target code instructions to complete the block from the checkpoint, wherein the subject-to-target interpreter is arranged to insert serialisation instructions into the target code instructions generated by the subject-to-target interpreter.

In one aspect, the controller unit further comprises a target-to-target interpreter arranged to interpret the remainder instructions in the block into modified target code instructions including inserting serialisation instructions.

In one aspect, the memory consistency protection unit is arranged to regenerate the remainder instructions to insert serialisation instructions and then cause execution of the regenerated remainder instructions to complete execution of the block.

In one aspect, the controller unit is arranged to retain at least one dual block comprising an original generated version of the block referring to the first virtual address space region and without memory consistency protection, and a modified version of the block containing at least one group of instructions referring to the shared virtual address space region with memory consistency protection; and the shared memory detection unit is arranged to perform a dynamic test at least upon entry to the dual block and in response selectively execute either the original version or the modified version of the dual block.

In another exemplary aspect of the invention there is provided a method to protect memory consistency in a multiprocessor computing system having a memory and a plurality of processors, comprising the computer-implemented steps of: dividing a program into one or more program threads; selectively adapting the multiprocessor computing system into a first mode, a second mode or a third mode in response to execution behaviour of the program, wherein: in the first mode, the program is divided into a single program thread and is executed on a one of a plurality of processors according to a first memory consistency model; in the second mode, the program is divided into a plurality of the program threads and each of the program threads execute together on a single selected one of the plurality of processors according to the first memory consistency model; and in the third mode, the program is divided into the plurality of program threads which are executed on any two or more of the plurality of processors with active memory consistency protection to enforce a second memory consistency model at least in relation to identified instructions within the program threads which access a shared memory area.

In one aspect, the method further comprises escalating the system from the first mode to the second mode and/or from the second mode to the third mode in response to the execution behaviour of the program.

Conversely, in one aspect the method further comprises de-escalating the system from the first mode to the second mode and/or from the second mode to the third mode in response to the execution behaviour of the program.

In one aspect, the method further comprises monitoring loading of the single selected one of the plurality of processors and in response selectively escalating the system from the second mode to the third mode.

In one aspect, the method further comprises setting the system into the first mode, the second mode or the third mode individually for each of a plurality of the programs executing on the multiprocessor computing system.

In another aspect there is provided a computer-readable storage medium having recorded thereon instructions which when implemented by a multiprocessor computer system having a memory and a plurality of processors cause the computer system to perform the steps of: dividing a program into one or more program threads; and selectively adapting the multiprocessor computing system into a first mode, a second mode or a third mode in response to execution behaviour of the program, wherein: in the first mode, the program is divided into a single program thread and is executed on one of a plurality of processors according to a first memory consistency model; in the second mode, the program is divided into a plurality of the program threads and each of the program threads execute one at a time on one of the plurality of processors according to the first memory consistency model; and in the third mode, the program is divided into the plurality of program threads which are executed simultaneously on any two or more of the plurality of processors with active memory consistency protection to enforce a second memory consistency model at least in relation to identified instructions within the program threads which access a shared memory area of the memory.

Some of the exemplary embodiments discussed herein provide improved memory consistency when undertaking program code conversion. In particular, the inventors have developed mechanisms directed at program code conversion, which are useful in connection with a run-time translator that performs dynamic binary translation. For further information regarding program code conversion as may be employed in the example embodiments discussed herein, attention is directed to PCT publications WO2000/22521 entitled "Program Code Conversion", WO2004/095264 entitled "Method and Apparatus for Performing Interpreter Optimizations during Program Code Conversion", WO2004/097631 entitled "Improved Architecture for Generating Intermediate Representations for Program Code Conversion", WO2005/006106 entitled "Method and Apparatus for Performing Adjustable Precision Exception Handling", and WO2006/103395 entitled "Method and Apparatus for Precise Handling of Exceptions During Program Code Conversion", which are all incorporated herein by reference.

The present invention also extends to a controller apparatus or translator apparatus arranged to perform any of the embodiments of the invention discussed herein. Also, the present invention extends to computer-readable storage medium having recorded thereon instructions which when implemented by a multiprocessor computer system perform any of the methods defined herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

BRIEF DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, when considering the general principles of the present invention defined herein.

Figure 1:
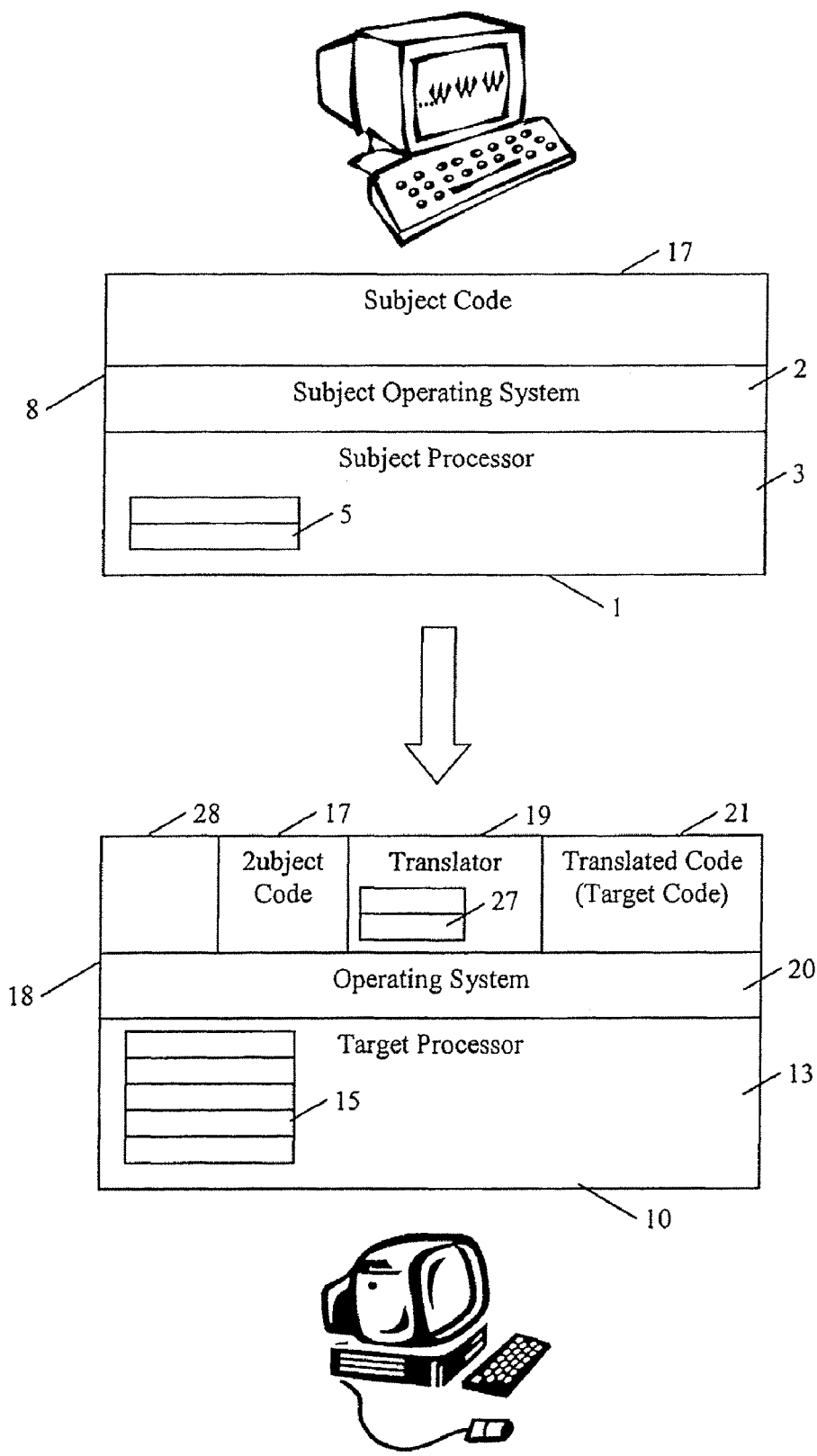
FIG. 1 is a block diagram illustrative of two multiprocessor computing systems relevant to example embodiments of the present invention.

FIG. 1 gives an overview of a system and environment where the example embodiments of the present invention find application, in order to introduce the components, modules and units that will be discussed in more detail below. Referring to FIG. 1, a subject program 17 is intended to execute on a subject computing system 1 having at least one subject processor 3. However, a target computing system 10 instead is used to execute the subject program 17, through a translator unit 19 which performs program code conversion. The translator unit 19 performs code conversion from the subject code 17 to target code 21, such that the target code 21 is executable on the target computing system 10.

As will be familiar to those skilled in the art, the subject processor 3 has a set of subject registers 5. A subject memory 8 holds, inter alia, the subject code 17 and a subject operating system 2. Similarly, the example target computing system 10 in FIG. 1 comprises at least one target processor 13 having a plurality of target registers 15, and a memory 18 to store a plurality of operational components including a target operating system 20, the subject code 17, the translator code 19, and the translated target code 21. The target computing system 10 is typically a microprocessor-based computer or other suitable computer apparatus.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator code 19 is suitably a compiled version of source code implementing the translator, and runs in conjunction with the operating system 20 on the target processor 13. It will be appreciated that the structure illustrated in FIG. 1 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 1, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator 19 may select just one of these basic blocks (block mode) or select a group of the basic blocks (group block mode). A group block suitably comprises two or more basic blocks which are to be treated together as a single unit. Further, the translator 19 may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated ("planted") based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of register definitions which correspond to specific features of the subject architecture upon which the subject program 17 is intended to run. For example, there is a unique register definition for each physical register on the subject architecture (i.e., the subject registers 5 of FIG. 1). As such, register definitions in the translator 19 may be implemented as a C++ object which contains a reference to an IR node object (i.e., an IR tree). The aggregate of all IR trees referred to by the set of register definitions is referred to as the working IR forest ("forest" because it contains multiple abstract register roots, each of which refers to an IR tree). These IR trees and other processes suitably form part of the translator 19.

FIG. 1 further shows native code 28 in the memory 18 of the target architecture 10. There is a distinction between the target code 21, which results from the run-time translation of the subject code 17, and the native code 28, which is written or compiled directly for the target architecture. In some embodiments, a native binding is implemented by the translator 19 when it detects that the subject program's flow of control enters a section of subject code 17, such as a subject library, for which a native version of the subject code exists. Rather than translating the subject code, the translator 19 instead causes the equivalent native code 28 to be executed on the target processor 13. In example embodiments, the translator 19 binds generated target code 21 to the native code 28 using a defined interface, such as native code or target code call stubs, as discussed in more detail in published PCT application WO2005/008478, the disclosure of which is incorporated herein by reference.

Figure 2:
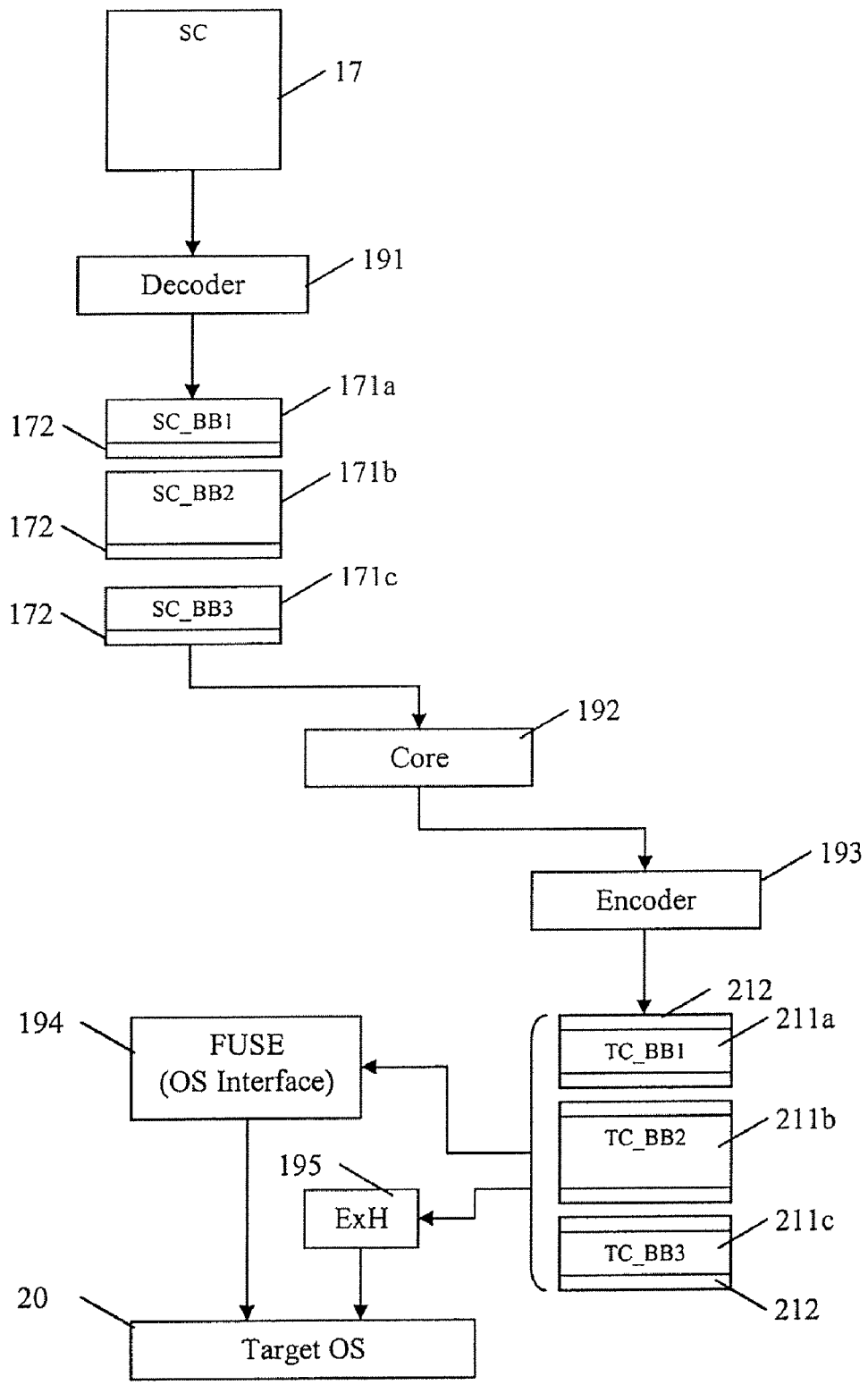
FIG. 2 is a schematic overview of parts of the exemplary system which perform a program code conversion process.

FIG. 2 illustrates the translator unit 19 in more detail when running on the target computing system 10. The front end of the translator 19 includes a decoder unit 191 which decodes a currently needed section of the subject program 17 to provide a plurality of subject code blocks 171a, 171b, 171c (which usually each contain one basic block of subject code), and may also provide decoder information 172 in relation to each subject block and the subject instructions contained therein which will assist the later operations of the translator 19. In some embodiments, an IR unit in the core 192 of the translator 19 produces an intermediate representation (IR) from the decoded subject instructions, and optimisations are opportunely performed in relation to the intermediate representation. An encoder 193 as part of the back end of the translator 19 generates (plants) target code 21 executable by the target processor 13. In this simplistic example, three target code blocks 211a-211c are generated to perform work on the target system 10 equivalent to executing the subject code blocks 171a-171c on the subject system 1. Also, the encoder 193 may generate control code 212 for some or all of the target code blocks 211a-211c which performs functions such as setting the environment in which the target block will operate and passing control back to the translator 19 where appropriate.

In some exemplary embodiments, the translator 19 is further arranged to identify system calls in the subject code 17. As discussed above, the target system 10 may use a different target operating system 20 and a different target ISA, and hence have a different set of system calls compared to the subject ISA. Here, in the translation phase, the decoder 191 is arranged to detect system calls of the subject ISA, where the subject code 17 calls the subject operating system 2. Most modern operating systems provide a library that sits between normal user-level programs and the rest of the operating system, usually the C library (libc) such as glibc or MS LibC. This C library handles the low-level details of passing information to the kernel of the operating system 2 and switching to a more privileged supervisor mode, as well as any data processing and preparation which does not need to be done in the privileged mode. On POSIX and similar systems, some popular example system calls are open, read, write, close, wait, execve, fork, and kill. Many modern operating systems have hundreds of system calls. For example, Linux has around three hundred different system calls and FreeBSD has about three hundred and thirty. Further, in some cases it is desired to maintain control of the target code and not pass execution control directly from the target code 21 to the target OS 20. In the exemplary embodiments, at least some of the system calls identified in the subject code 17 cause the target code 21 to be generated including function calls which call back into the translator 19, which will be termed herein control passing planted calls or simply "x_calls". These x_calls appear to the target code 21 as if a system call had been made to the target OS 20, but actually return execution control from the target code 21 back into the translator 19. In the example embodiment, the translator 19 includes a target OS interface unit (also termed a "FUSE") 194 which is called from the target code 21 by such x_calls. The FUSE 194 responds to the x_call, including performing actual system calls to the target OS 20 where appropriate, and then returns to the target code 21. Thus, the translator 19 effectively intercepts system calls made by the target code 21 and has the opportunity to monitor and control the system calls required by the target code 21, whilst the target code 21 still acts as if a system call had been made to the target OS 20.

As also shown in FIG. 2, in some exemplary embodiments the translator 19 is arranged to selectively intercept exception signals raised during execution of the target code 21. The translator 19 includes one or more exception handlers 195 that are registered with the target OS to receive at least some types of exception signals raised by execution of the target code 21. The exception handler 195 is thus able to selectively intervene where appropriate in handling the exception and inform the translator 19 that a certain exception has been raised. Here, the exception handler 195 either handles the exception and resumes execution as appropriate (e.g. returning to the target code 21), or determines to pass the exception signal to an appropriate native exception handler such as in the target OS 20. In one embodiment, the translator 19 provides a proxy signal handler (not shown) that receives selected exception signals and passes certain of the received exception signals to be handled by the appropriate exception handler 195.

Figure 3:
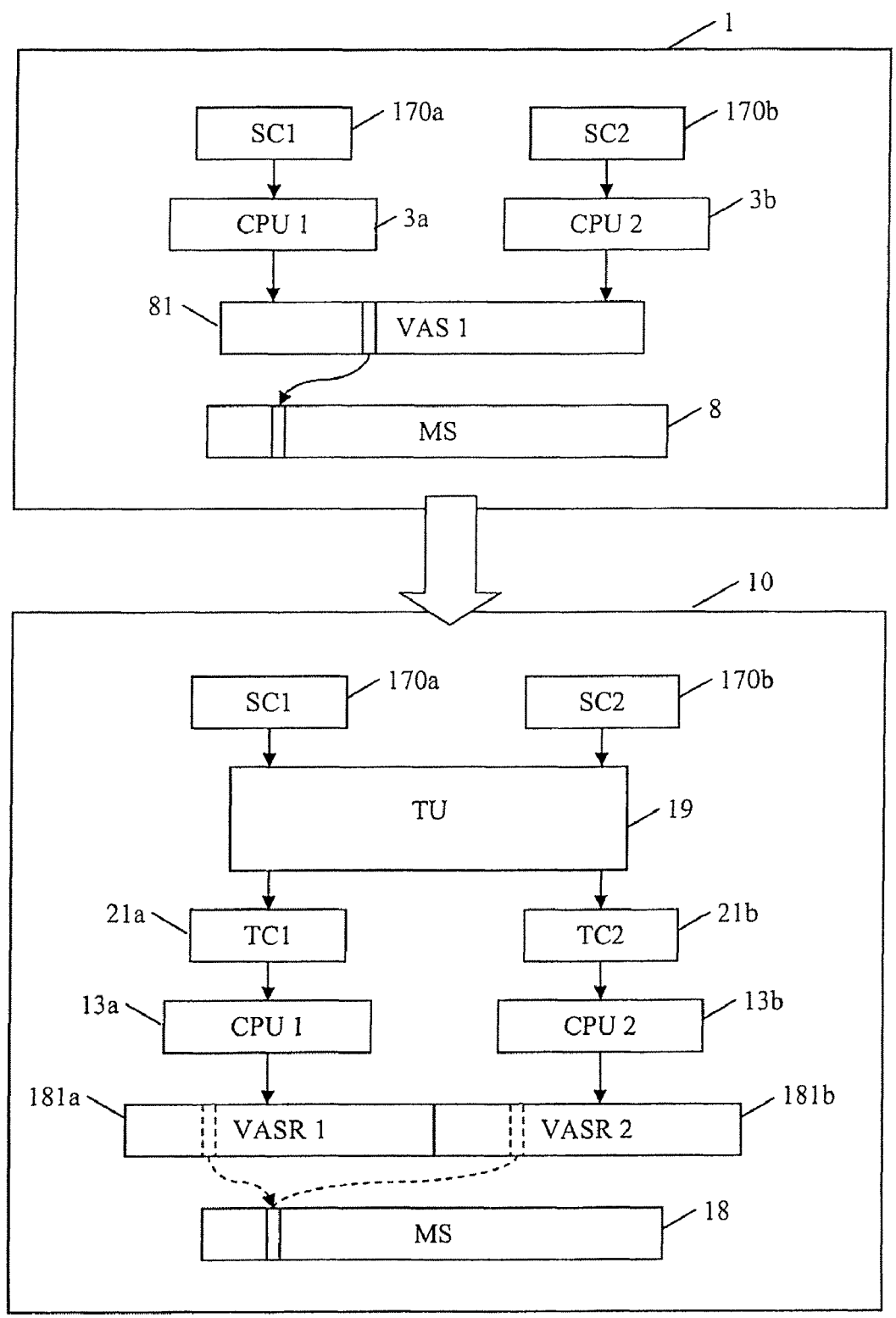
FIG. 3 is another schematic overview of two multiprocessor computing systems relevant to example embodiments of the present invention.

FIG. 3 is a schematic diagram showing a computer system according to an exemplary embodiment of the present invention.

Firstly, for illustration and ease of explanation, FIG. 3 shows a multiprocessor subject computing system 1 having two processors 3a, 3b which execute separate portions of subject code 170a, 170b (SC1 & SC2) and access data stored in a memory subsystem (MS) 8.

Most commonly, the subject code portions 170a, 170b executing on the processors 3a, 3b access the physical memory 8 by referring to an address space (VAS) 81 which maps memory access addresses referred to in the subject code 170a, 170b to physical memory addresses in the memory subsystem 8. Hence, the term virtual address space is used in the art to distinguish the code's address space from the physical addressing.

In some circumstances, the first and second subject code portions 170a, 170b are both intended to access the same region of the physical memory 8. In the example situation illustrated in FIG. 3, an area such as a page of the memory 8 is mapped in the virtual address space 81 by both the subject code portions 170a, 170b. In other cases, an explicitly shared memory area is mapped into two different virtual address spaces.

As discussed above, a memory consistency model of the subject computing architecture 1 defines the semantics of memory accesses and the extent to which the processors 3a, 3b and the memory subsystem 8 may reorder memory accesses with respect to the original program order of the subject code 17. In this example, the subject architecture 1 has relatively strong ordering constraints. That is, the subject memory consistency model may define that consecutive stores and consecutive loads are ordered, but that a store followed by a load or a load followed by a store may be reordered compared to the program order. The memory consistency model in this example subject architecture can be briefly summarised in the following Table 1.

TABLE 1

| First Instruction | Second Instruction | Constraint |
| --- | --- | --- |
| Store | Store | Ordered |
| Store | Load | Not ordered |
| Load | Store | Not ordered |
| Load | Load | Ordered |

The subject code 17 relies on the memory consistency model in order to function correctly. In practice, subject code is often written and debugged to the point at which it works on the currently available versions of the subject hardware. However, implementing the subject code 17 on a target computing system 10 as a different version of the subject computing system 1, or converting the subject code 17 to run on a totally different target computing system 10, can reveal weaknesses in the subject code. Here, there are many practical examples of multiprocessor systems which employ various different forms of relaxed memory consistency, including Alpha, AMD64, IA64, PA-RISC, POWER, SPARC, x86 and zSeries (IBM 360, 370, 390) amongst others.

As shown in FIG. 3, the translator unit (TU) 19 on the target computing system 10 converts the subject code 17 into target code portions 21a, 21b for execution on multiple target processors 13a, 13b with reference to the physical memory 18 of the target system, here through respective virtual address space regions 181a, 181b which will be explained in more detail later. In this example, the target computing system 10 has a memory consistency model with weaker, more relaxed constraints than those of the subject system 1. For example, the target memory consistency model may specify that there is no ordering whatsoever and the target memory consistency model allows loads and stores to be freely reordered whilst maintaining program semantics, as summarised in the following Table 2.

TABLE 2

| First Instruction | Second Instruction | Constraint |
|---|---|---|
| Store | Store | Not ordered |
| Store | Load | Not ordered |
| Load | Store | Not ordered |
| Load | Load | Not ordered |

As will be familiar to those skilled in the art, the memory subsystem 18 may include various cache structures (not shown) which are designed to increase memory access speeds. The memory subsystem 18 may comprise two or more layers of physical memory including cache lines provided by on-chip or off-chip static RAM, a main memory in dynamic RAM, and a large-capacity disc storage, amongst others, which are managed by the memory subsystem according to the architecture of the subject computing system. There are many mechanisms to protect cache consistency (also termed cache coherency) to ensure that the cache structures remain consistent, but these are not particularly relevant to the examples under consideration and are not discussed further herein.

A simplified example will now be provided to illustrate some of the ways in which memory consistency errors may arise in the target computing system 10. In this example, two memory locations (*area1, *area2) are accessed. These locations are assumed to be on different memory pages to ensure that they are not on the same cache line within the cache structure of the target memory subsystem 18, and to increase the possibility that accesses to the memory 18 will happen out of order. Initially, we define the values stored in these locations as *area1=0 and *area2=0. The first processor 13a is executing a first portion of target code 21a which monitors the values stored in *area2 and then sets a variable "a" according to the value of *area1, as illustrated in the following pseudocode:

```
while (*area2 == 0) { }
int a = *area1
```

The second processor 13b executes a second portion of target code 21b which contains instructions that modify the values stored in the two memory locations:

```
*area1 = 1
*area2 = 1
```

Intuitively, we expect that the variable "a" should now be set to the value "1". Indeed, in a strongly ordered sequentially consistent system, this would be true. However, a memory consistency error may arise such that the variable "a" is instead set to "0". The error may arise for two typical reasons.

Firstly, relaxed store ordering may allow the second store (*area2=1) to reach the memory before the first store (*area1=1). The first processor 13a is then able to read the old value of *area1. Secondly, relaxed load ordering allows loads to be issued out of order in the instruction pipeline within the first processor 13a, including loads that a speculatively executed. In this case, while the first processor 13a is waiting for *area2 to change, the value in *area1 is already speculatively loaded and will not be reloaded once the test succeeds. This means that even though the stores from the second processor 13b are correctly ordered, the first processor 13a can still read the updated values in a different order.

Most multiprocessor systems provide a safety net which enables the program code to override the relaxed memory consistency model of the hardware and impose stronger ordering constraints, thereby providing a measure of protection against memory consistency errors. One such safety net mechanism uses serialisation instructions in the target code 21a, 21b to form appropriate synchronisation points, whilst another such safety net is to safeguard certain areas of memory by setting attributes in a page table. These and other memory consistency protection mechanisms can be employed alone, or in combination, as will be discussed later below. However, in each case there is a significant performance penalty. As an example, the target system will execute two to three times slower than without such protection mechanisms, i.e. invoking these additional safety mechanisms causes the target machine to operate at 30% to 50% of its potential full speed.

In terms of the specific forms of memory consistency protection which are enforced, firstly there is the use of serialisation instructions, which in one commonly available form is a fence instruction. The fence instruction forms a memory barrier which divides the program instructions into those which precede the fence and those which follow. Memory accesses caused by instructions that precede the fence are performed prior to memory accesses which are caused by instructions which follow the fence. Hence, the fence is useful in obtaining memory consistency, but incurs a significant performance penalty. The instruction SYNC in the IBM POWER Instruction Set Architecture is a prime example of a fence instruction. Other specific variations of the fence instruction are also available in the POWER ISA, such as a lightweight synchronisation (LWSYNC) instruction or Enforce In-order Execution of I/O (EIEIO) instruction. Other examples include MB and MBW from the Alpha ISA, MFENCE from the x86 ISA and MEMBAR from the SPARC ISA.

Some ISAs also provide one or more serialisation instructions which synchronise execution of instructions within a particular processor. That is, instruction synchronisation causes the processor to complete execution of all instructions prior to the synchronisation, and to discard the results of any instructions following the synchronisation which may have already begun execution. After the instruction synchronisation is executed, the subsequent instructions in the program may then begin execution. Here, the instruction ISYNC in the IBM POWER Instruction Set Architecture is a prime example of an instruction to perform such an instruction synchronisation.

These serialisation instructions are inserted into the target code to assert a memory consistency model which differs from the default memory consistency model of the target machine. Inserting these serialisation instructions into the example pseudo code discussed above results in modified target code 21a and 21b as follows.

For the first processor 13a, the serialisation instruction ISYNC is inserted (because of the Load-Load ordering specified in Table 1) so that the target code 21a becomes:

```
while (*area2 == 0) { }
isync
int a = *area1
```

For the second processor 13b, the serialisation instruction SYNC is inserted so that the target code 21b becomes:

```
*area1 = 1
sync
*area2 = 1
```

Turning now to another mechanism to provide protection against memory consistency errors, some target computing systems allow the manipulation of page table attributes. As a specific example, the IBM POWER architecture allows certain areas of the memory 18 to be designated as both caching-inhibited and guarded (hereafter called store-ordered). If separate store instructions access such a protected area of memory, the stores are performed in the order specified by the program. Conveniently, some pages of the memory are marked as store-ordered, whilst other pages of the memory are not store-ordered. The store-ordered pages may be used to assert a memory consistency model which differs from the default memory consistency model of the target machine. However, access to such store-ordered pages usually incurs a significant performance penalty compared with accesses to non store-ordered pages.

Figure 4:
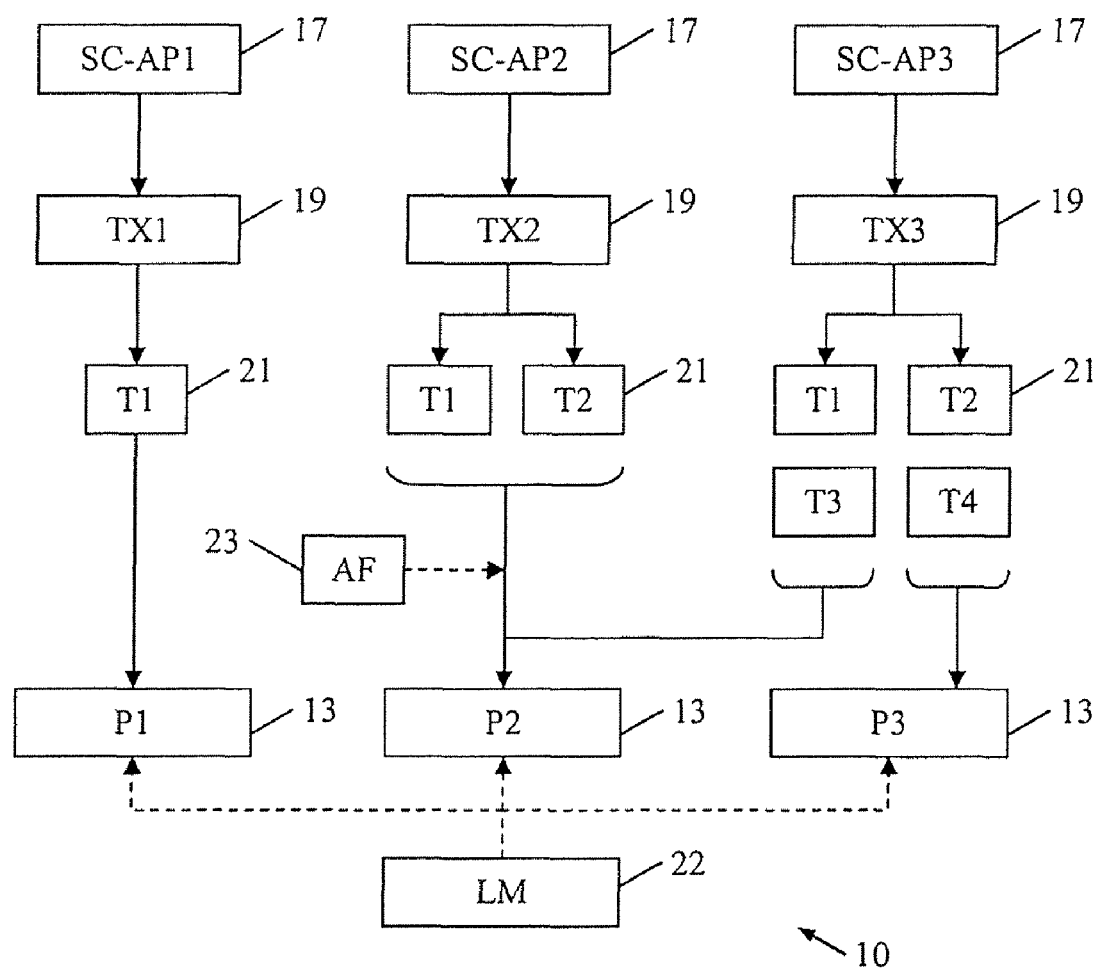
FIG. 4 is a schematic view of a multiprocessor computing system according to example embodiments of the present invention.

FIG. 4 is a schematic view of the multiprocessor computing system 10 of the exemplary embodiments of the present invention. The multiprocessor computer system includes a memory which stores the subject code 17 that is executed on a plurality of processors 13 (P1, P2 etc) through the translator 19. Also, a load monitor 22 is arranged to monitor loading of the processors 13. Further, an affinity unit 23 is arranged to set affinity so that certain portions of program code are executed on a restricted subset of the plurality of processors 13, as will be explained in more detail below.

Referring to FIG. 4, the subject code 17 is suitably an application program which is converted into the target code 21 to execute on the target system 10 with the support of the translator 19. As general examples, the subject code 17 is a complex program such as a web server, a digital content server (e.g. a streaming audio or streaming video server), a word processor, a spreadsheet editor, a graphics image editing tool, or a database application. The target computing system 10 is often required to run many such applications simultaneously (SC-AP1, SC-AP2, etc.), in addition to other tasks such as those associated with the operating system 20 and the translator 19. The example embodiments provide multiple translators 19 (TX1, TX2, etc.), each of which is responsible for an associated subject application program (SC-AP1, SC-AP2, etc.). These multiple instances of the translator 19 execute in parallel on the target system.

Many of these commercially-available application programs execute as a plurality of processes and/or as a plurality of process threads (T1, T2, etc.). Here, although the exact implementation differs depending upon the specific computing architecture, each process generally has a relatively large amount of state information (also commonly termed context information) and has its own virtual address space. By contrast, a parent process may spawn one or more threads which usually share the state information of their parent process, and two threads from the same process will usually share the virtual address space of the parent process. Switching between threads from the same parent process is typically faster than context switching between processes, and multithreading is a popular programming and execution model on modern multiprocessor systems. For clarity, the following description refers generally to a program code portion or a program thread as a part of a program that is executed substantially independently, i.e. in parallel with other such portions, on the target multiprocessor computing system 10.

As noted above, the multiple translator units 19 execute in parallel on the target machine 10. In the example embodiment, each of the translators 19 performs dynamic binary translation to convert and execute a respective subject application program (SC-AP1, SC-AP2, etc.) as the target code 21. As a result, there exists a highly complex arrangement with many tens or even hundreds of individual threads executing on the multiple processors of the host target system 10.

In the context of dynamic binary translation, each program in the subject code 17 may take the form of a binary executable which has been created (e.g. compiled) specific to the particular subject architecture 1. Hence, there is no opportunity for human intervention or review of the subject code 17 and the subject code 17 is automatically converted into target code 21 (i.e. target binary) for execution on the target computing system 10. The mechanisms discussed herein will, in at least some embodiments, allow such a conversion process to be implemented automatically, whilst also protecting memory consistency.

FIG. 4 illustrates three modes of operation which are available in the multiprocessor computing system. Each of these modes contributes to the memory consistency protection.

For ease of explanation, FIG. 4 shows three application programs SC-AP1, SC-AP2 and SC-AP3. Here, the system is shown in the first mode for the first application program SC-AP1. Also, the system is shown in the second mode for the second application program SC-AP2. Further, the system is shown in the third mode for the third application program SC-AP3.

Let us assume that the first example subject code application program SC-AP1 results in a single target code program thread T1. In the first mode, this single thread is scheduled to execute on only a single processor P1 at any one time. That is, the computing system determines that a single thread T1 executes solely on a single processor at any particular point in time. A single processor is internally memory consistent, and thus there is minimal exposure to memory consistency errors for the single thread T1 of this first program SC-AP1.

To illustrate the second mode, the second subject code application program SC-AP2 is executed as multiple program code portions, i.e. first and second threads T1 & T2. However, in this second mode, the affinity unit 23 sets affinity so that both threads T1 & T2 execute on the same processor which, in this example, this is the processor P2. The two threads T1 & T2 are only ever executed one at a time on the respective single processor P2. That is, even though processor P2 switches between the multiple threads T1 & T2, only one of the threads is active in the processor at any one time. Again, the single processor is internally memory consistent when executing multiple threads and thus there is minimal exposure to memory consistency errors for the pair of threads T1 & T2 of this second program SC-AP2.

Here, in the first mode and the second mode, the default memory consistency model of the computing system is applied even though the relevant subject program SC-AP1 or SC-AP2 expects to execute in an environment having a second, e.g. stronger, memory consistency model. Advantageously, this default memory consistency model is sufficient to achieve the desired level of memory consistency protection with minimal overheads or performance penalties.

In the second mode, the load monitor 22 monitors loading of the processors, including particularly the processor P2 which is running the two threads T1 & T2 of the second application program SC-AP2. As will be explained in more detail later, the load monitor 22 generates alerts when the loading of a monitored processor exceeds a predetermined threshold. These alerts are delivered to the translators 19. In this illustrated example, the load monitor 22 sends an alert to the second translator unit TX2, which controls execution of the second program SC-AP2. In response to these alerts, the relevant translator TX2 determines whether it is appropriate to continue in the second mode or else escape into the third mode.

The third mode is illustrated by the third subject code application program SC-AP3. This program runs through the third translator TX3 to produce multiple program threads T1-T4. In this third mode, the multiple threads are freed to execute on any suitable one or more of the available processors P1-P3. In the illustrated example, the first and third threads T1 & T3 are executed on processor P2, whilst the second and fourth threads T2 & T4 are executed by processor P3. It will be appreciated that spreading related threads across multiple processors exposes a strong risk of memory consistency errors. However, the relevant translator TX3 now selectively intervenes to apply an active memory consistency protection to these multiple program threads T1-T4 according to a second memory consistency model. That is, the translator TX3 selectively, for example, inserts serialisation instructions into the program threads or forces store-ordered pages.

In one example embodiment, these active memory consistency protection mechanisms are applied globally to all of the code relating to the relevant subject program when the system is operating in the third mode. Alternatively, in another example embodiment which will be described in greater detail below, the system is arranged to apply such active memory consistency protection mechanisms selectively to selected portions of the code relating the subject program under consideration. That is, the active protection is applied only where determined to be needed. In each case, the second memory consistency model is adhered to which is different to the default memory consistency model of the computer system. Typically, this second model has stronger ordering constraints compared with the weaker default model.

It will be appreciated that these first to third modes are applied in the system responsive to behaviour experienced during execution of the various application programs. Typically, a particular program such as SC-AP1 starts as a single thread and thus the system runs initially in the first mode. Then, for example, the program SC-AP1 spawns a child thread and in response the system enters the second mode. Later, the load monitor detects that the relevant processor, i.e. processor P2 in the example of FIG. 4, becomes overloaded. In response, the system then enters the third mode and continues execution of the program SC-AP1 in that third mode. Thus, the multi-mode system adapts to the particular needs of the executing programs.

In practice, many programs escalate sequentially in execution from the first mode through the second mode to the third mode. However, other programs have differing behaviours. For example, a program, such as illustrated by SC-AP2, may create multiple threads at initialisation. In which case, the system immediately enters the second mode upon initialisation and may later escalate to the third mode. As another example, a single threaded program such as SC-AP1 may request explicitly shared memory. Thus, it is now expected that this explicitly shared memory will also be accessible by other parts of the computer system, such as another application program, and may thus become susceptible to memory consistency errors. As a result, this system may move directly from the first mode to the third mode. In this third mode, the active memory consistency protection mechanism is applied as appropriate to the single thread of the application program SC-AP1 in order to actively protect against memory consistency errors at least in relation to the detected explicitly shared memory area.

Thus, the exemplary embodiments are, on the one hand, capable of preserving memory consistency in order to address the memory consistency issues such as discussed above whilst, on the other hand, maintaining acceptable performance of the multiprocessor computing system. In particular, the exemplary embodiments are able to minimise, or in some cases even avoid altogether, the heavy performance penalties associated with the active memory consistency protection mechanisms such as serialisation instructions and store-ordered pages.

Figure 5:
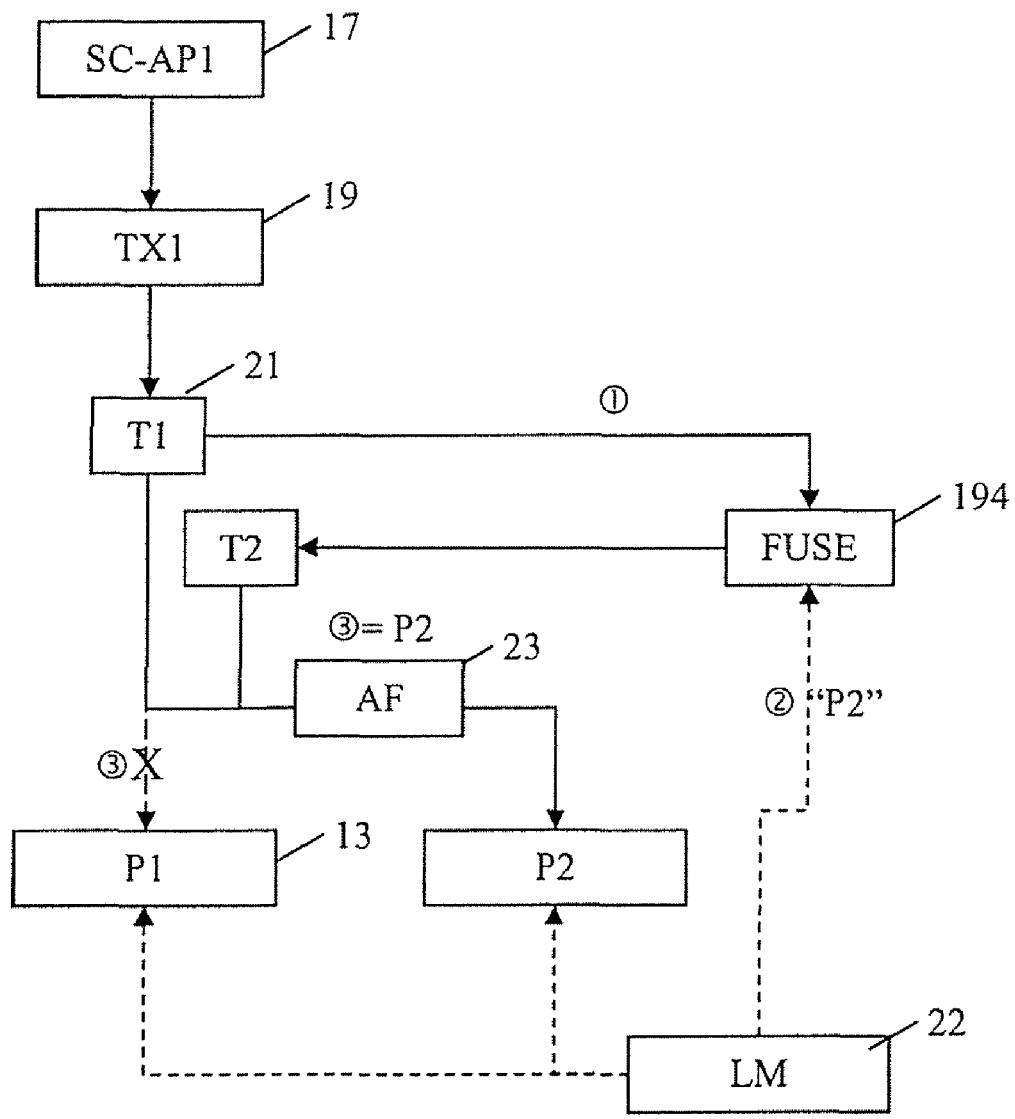
FIG. 5 is a schematic view of the multiprocessor computing system in a first mode.

FIG. 5 is a schematic diagram illustrating the first mode of the multiprocessor computing system in more detail.

In FIG. 5, the system is initially in the first mode executing the single thread T1. Here, the single thread T1 is freely allocated to any suitable processor 13 using default allocation and scheduling mechanisms of the system. In many systems this is termed soft affinity. The system automatically selects appropriate processor hardware 13 to execute the thread T1 according to criteria such as load balancing.

When an event occurs to initiate multi-threaded operation then the system responds by moving into the second mode.

As noted above, the OS interface unit (FUSE) 194 intercepts system calls made by the target code 21, whereby the FUSE 194 is called by x-calls planted in the target code 21 in place of certain system calls. Thus, a system call, such as a "clone" system call which initiates a new thread, is intercepted by the FUSE 194. In response, the system is changed into the second mode. The OS system call is made by the FUSE 194 to initialise the new thread T2. Then, execution control returns to the executing target code 21 with the system in the second mode.

To change from the first mode to the second mode, the exemplary embodiments perform the actions which are illustrated in FIG. 5. Here, the FUSE 194 requests a current load status from the load monitor 22 as illustrated at ① and the load status is provided as at ②. In response, the system selects one of the processors which is currently lightly loaded and the affinity unit 23 sets affinity for the target code 21, in this case threads T1 and T2, to the selected processor as at ③. For example, program SC-AP1 was executing on processor P1 at the time of the intercepted system call but the current load status indicates that processor "P2" would be most appropriate for future execution. Thus, the affinity unit 23 sets affinity to the indicated processor P2. This is a hard affinity. That is, the affinity set by the affinity unit 23 overrides the soft affinity of the system. As a result, the existing thread T1 and the newly created thread T2 always now execute on the selected processor P2. In Linux-based systems affinity is set by a system command of the form "taskset [options] [mask|list] [pid|command [arg] . . . ]." Similar commands exist on other systems to the same general effect. The result is that the multiple threads of the particular program SC-AP1 all now execute on the same processor. Any further threads initiated by the relevant program SC-AP1 will also have affinity set to the selected processor P2 and in effect are locked to execute together on a single selected processor.

As a further refinement, in the example embodiment the load monitor 22 records that the translator TX2 is now operating in accordance with the second mode, which can also be referred to conveniently as an affinity mode or hard affinity mode. Conveniently, the load monitor sets a flag to show that the system in now in the affinity mode for the application program 17 SC-AP1 running through the respective translator 19 TX1.

Effectively, the multiple threads T1, T2 of the relevant program are now executed one at a time on the selected processor. An alternative mechanism, which applies particularly in some Linux-based systems, is to limit the process running program SC-AP1 to schedule only one thread at any one time, even though multiple threads exist in the process. Thus, the system preserves memory consistency in the second mode by executing only one thread at any one time—either by setting hard affinity so that all threads execute on a single selected processor, or by limiting the process to schedule only one thread at any one time on any available processor, or a combination of both.

Figure 6:
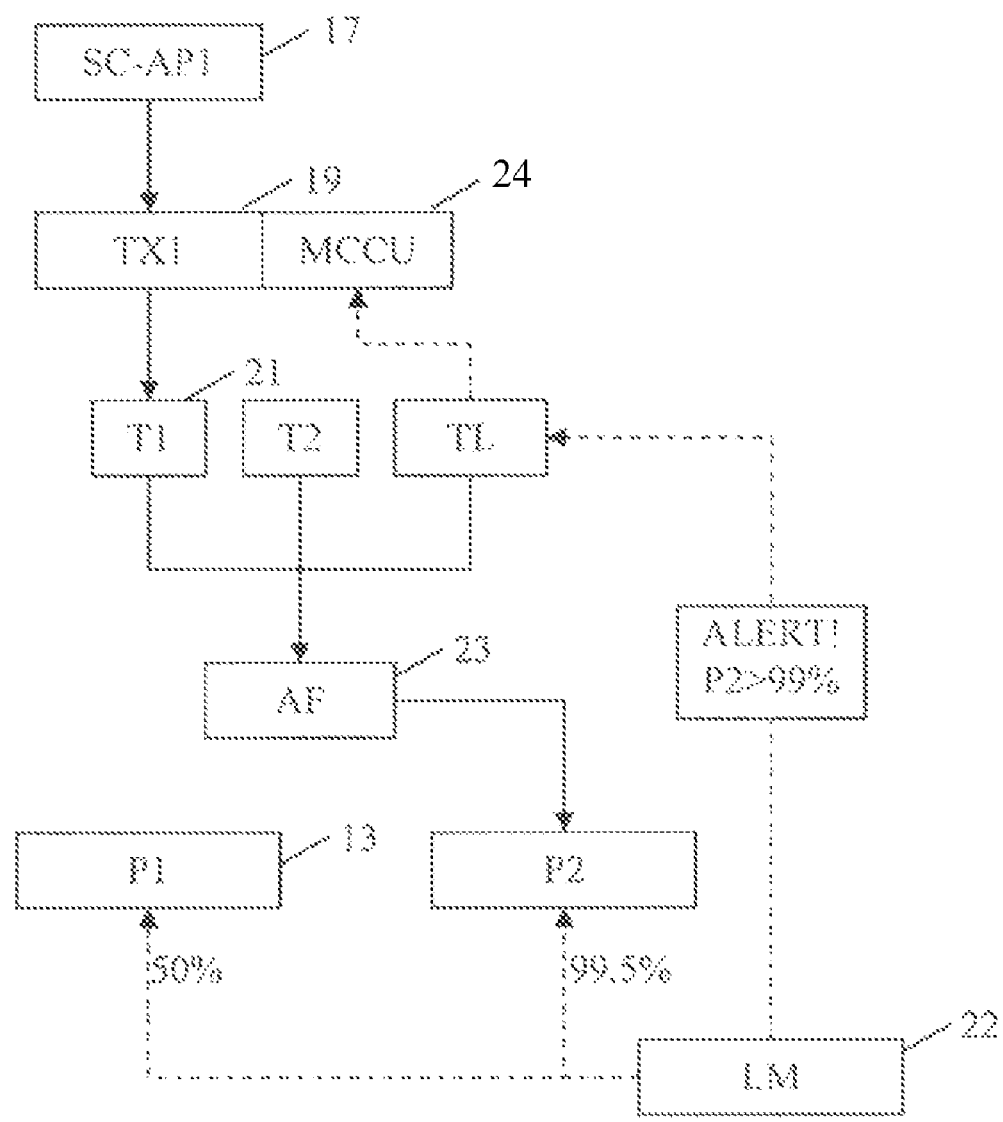
FIG. 6 is a schematic view of the multiprocessor computing system in a second mode.

FIG. 6 is a schematic diagram illustrating the second mode of the multiprocessor computing system in more detail.

In practical embodiments, the second mode imposes a performance penalty from 0% up to around 10%. Thus, it is desirable to remain in the second mode for as long as possible. However, it will be appreciated that throttling the many threads to run a single processor eventually becomes inefficient, especially if there are other processors in the system which are lying idle or are underutilised. Thus, the second mode also includes an escape mechanism which, when invoked, allows the system to automatically switch to the third mode.

The load monitor 22 monitors loading of the processors P1, P2 etc by obtaining a current percentage load figure of each processor. In Linux-based systems, a hardware counter is interrogated at intervals of around once per second. The percentage load figure is typically reported divided into I/O, scheduler and userspace processes. Here, the userspace percentage indicates work by the application program and the other categories are ignored. The load monitor 22 compares the reported load percentage against a predetermined threshold, such as 98% or 99%. When the processor load percentage is below the threshold, the load monitor 22 takes no further action and simply waits for the next periodic inspection of the load percentage. However, when the load percentage for a particular processor exceeds the predetermined threshold, then the load monitor 22 generates an alert. In the example embodiments, the alert is sent to the relevant translator 19, in this case the translator TX1 which is recorded as being in the second affinity mode relevant to this processor P2. The other translators TX2, TX3 etc. are not alerted or at least are not responsive to this alert.

In the illustrated example embodiment, the translator TX1 has a separate listener thread TL which listens for the alerts generated by the load monitor 22. Conveniently, the separate listener thread avoids reusing signals (interrupts) which are otherwise employed in the translator 19 and/or in the target code 21. In response to the alert, the listener thread informs a memory consistency control unit 24 within the translator 19. This control unit 24 responds to the alert by determining whether to remain in the second mode or else escape into the third mode.

It is possible that the relevant processor P2 has exceeded the preset threshold only temporarily. Thus, it is desired to relate workload to a temporal domain and so remain in the second mode for as long as possible. However, a direct mechanism for tracking processor load over time is oftentimes not available or would be unduly expensive. Instead, in the example embodiments, the translator 19 TX1 responds to the alert by checking to determine how many threads T1, T2 etc are currently working. If the number of working threads exceeds a threshold then the control unit 24 determines to escape into the third mode. If not, then the alert is ignored and the system remains in the second mode.

This lightweight heuristic is achieved in the example embodiments by setting a working flag whenever a thread 21 T1, T2 enters code deemed to be working code and is unset whenever the thread enters code deemed not to be working code. Since the target threads 21 are generated by the translator 19, the translator has a convenient opportunity to add flag setting and flag clearing instructions to the target code. Thus, a sleep state or a wait state waiting for I/O are not deemed work, whereas a main execution loop of the application program is deemed to be working code.

The controller 24 checks the working flags for each thread in response to the alert. If the number of working threads is, e.g., greater than two, then the controller determines to enter the third mode. However, the system remains in the second mode if two or fewer threads are currently working. Other example embodiments employ heavier heuristics, but these lightweight heuristics have been found to be surprising effective. By probability, a processor which is overloaded will switch into the third mode within relatively few inspection cycles, whereas transient loading is successfully ignored.

Figure 7:
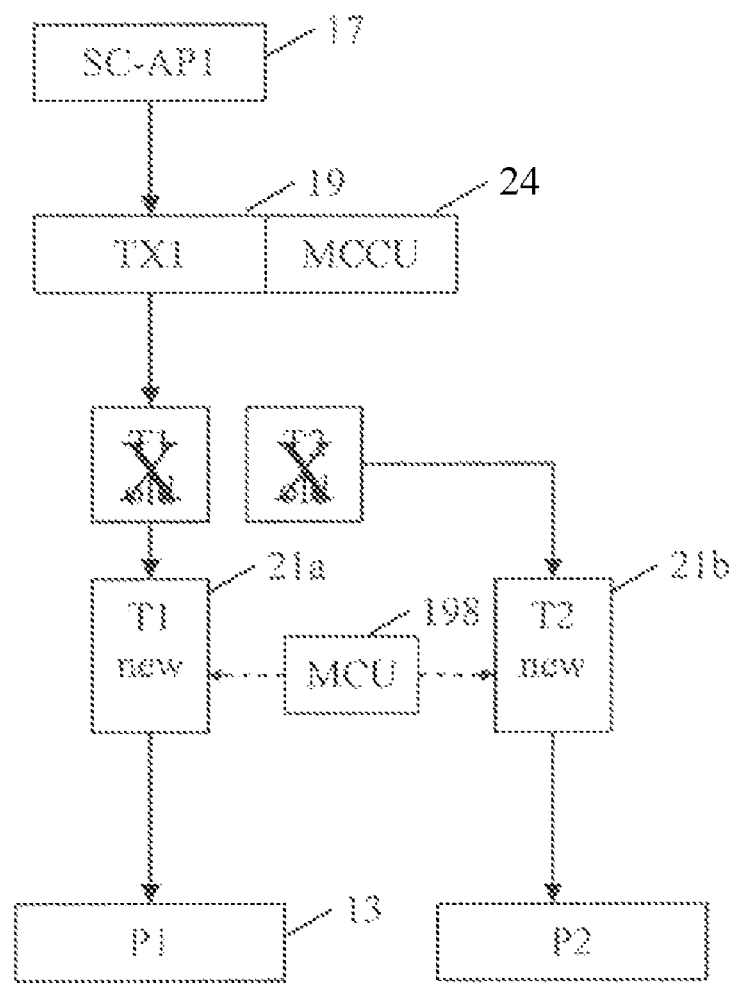
FIG. 7 is a schematic view of the multiprocessor computing system in a third mode.

FIG. 7 is a schematic diagram illustrating the third mode of the multiprocessor computing system in more detail.

To enter the third mode, the translator 19 stops all of the currently executing target program threads T1, T2, etc. Then, the translator reaches a recovery point in the executing code by rolling to a point where sufficient information is available to restart execution, such as by using roll-forward or roll-back mechanisms which are explained in detail later. Then, the translator selectively destroys the currently generated target code in these threads and regenerates replacement target code to which the active memory consistency protection is applied by a memory consistency protection unit MPU 198. Thus, the system now continues in the third mode.

As noted above, in the third mode the multiple threads of the application program SC-AP1 are free or unlocked, suitably without any set hard affinity, and are thus spread across multiple processors by the default system scheduler. In this example, thread T1 executes on processor P1 whilst thread P2 executes on the second processor P2.

In the exemplary embodiment, each target thread T1, T2 executes initially under a first memory consistency model, which is suitably the default memory consistency model applicable to the architecture of the target computing system. Then, the translator unit 19 is arranged to detect a memory access request with respect to a shared memory area which is accessible (or which will become accessible) to both of a first target code portion 21a such as the first thread T1 and a second target code portion 21b such as thread T2. Of course, this second code portion 21b may be executing on another processor and thus there exists now a risk of memory consistency errors. The mechanisms used to access such a shared memory area and various detection mechanisms as are considered herein will be discussed in more detail below. The MPU 198 then applies the active memory consistency protection such that at least certain instructions or certain groups of instructions in the first target code portion 21a execute under a protected second memory consistency model when accessing the detected shared memory area. Here, the translator unit 19 selectively applies a memory consistency protection mechanism which causes selected instructions within the first target code portion to access the identified shared memory area in a manner which enforces a second memory consistency model which is different to the first model. In particular, the protected second memory consistency model provides stronger ordering constraints than the first model, aimed at preventing memory consistency errors of the type noted herein. Later, when the second code portion 21b of thread T2 also attempts to access the shared memory area, the active memory consistency protection mechanism is further selectively applied such that at least selected instructions in the second program code portion 21b also now execute under the protected second memory consistency model in relation to the detected shared memory area.

In this exemplary embodiment, the first and second target code portions 21a, 21b are not initially restricted according to the second memory consistency model and instead execute initially under the default first model. That is, the target code is initially created and executed according to the higher-speed default memory consistency model of the target system. By applying the memory consistency protection mechanism only to those identified target code instructions which access those areas of memory 18 which have been detected as shared memory areas, the performance penalty incurred due to the restrictions and constraints of the second memory consistency model is substantially reduced compared with applying the enhanced second memory consistency model more generally across all memory accesses by the target code 21.

Figure 8:
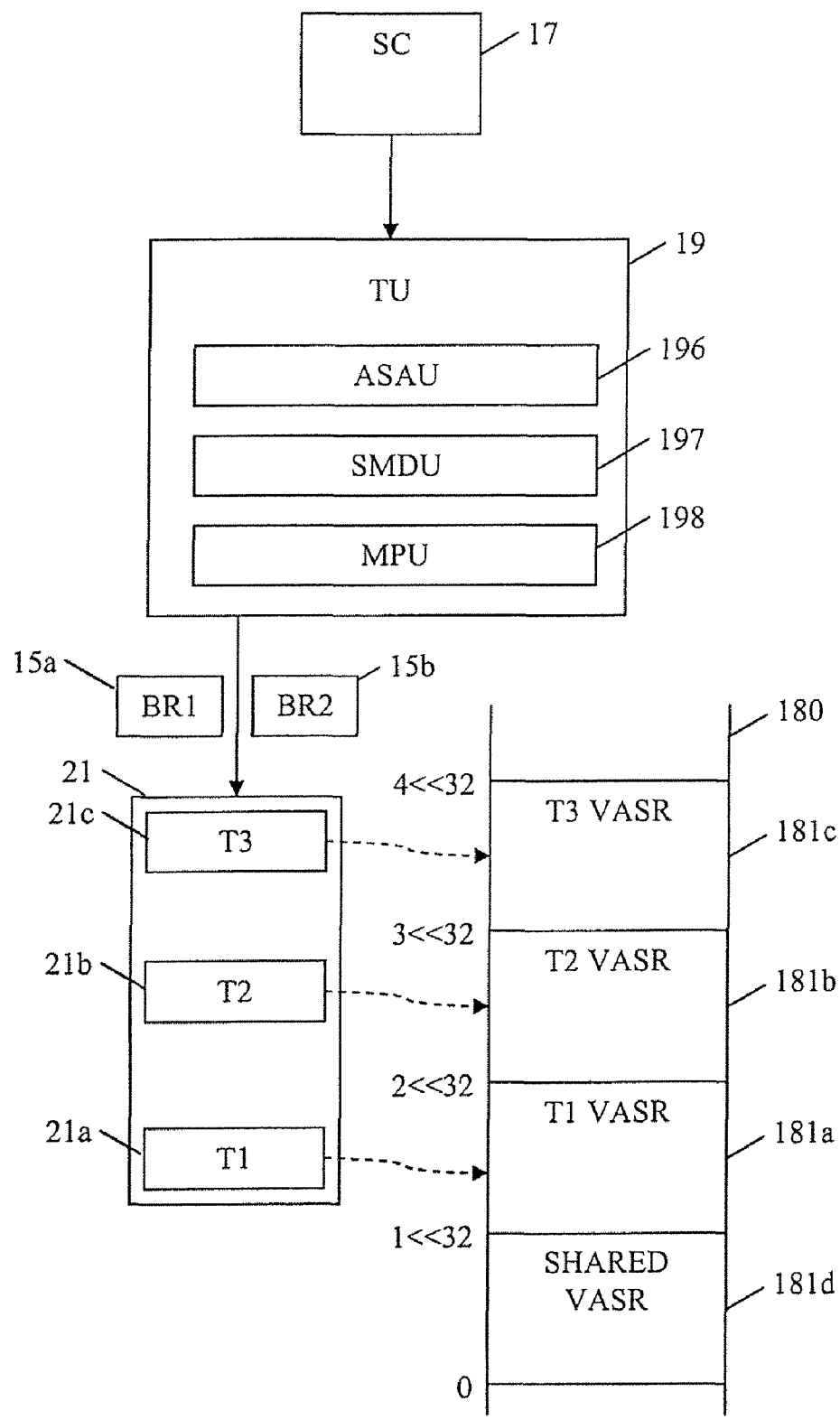
FIG. 8 is a schematic block diagram illustrating selected portions of the example system in more detail.

FIG. 8 is a schematic diagram showing selected parts of the target computing system 10 to further illustrate the exemplary embodiments of the present invention. In FIG. 8, the subject code 17 is a multithreaded application program which when translated into target code 21 executes as a plurality of target code portions (i.e. a plurality of program threads). Three such target code portions 21a-21c (T1, T2, T3) are shown for illustration.

As shown in FIG. 8, in addition to the units already described, the translator 19 of the exemplary embodiment further includes an address space allocation unit (ASAU) 196, and a shared memory detection unit (SMDU) 197.

The ASAU 196 is arranged to allocate a plurality of virtual address space regions (VASR) 181 to the plurality of target code portions 21a, 21b, 21c. Secondly, the ASAU 196 is arranged to direct the generated target code portions 21a-21c to access different ones of the plurality of allocated VASRs 181.

The SMDU 197 is arranged to detect a request by one of the target code portions 21a, 21b, 21c to access a shared memory area, for which specific embodiments are discussed below, and identifies one or more target code instructions within this target code portion for which memory consistency protection is required.

The MPU 198 is arranged to apply memory consistency protection to the selected target code instructions identified by the SMDU 197. This memory consistency protection causes the target code to enforce a different memory consistency model, in this case with stronger ordering constraints, to preserve memory consistency and thereby maintain the memory consistency model demanded by the subject code 17. Suitably, the MPU 198 selectively applies serialisation instructions to the target code and/or selectively asserts store-ordered pages, as will be discussed in detail later.

In the example of FIG. 8, three target code portions T1, T2, T3 (21a-21c) are shown each associated with a respective virtual address space region 181a-181c. Further, in this first embodiment the ASAU 196 allocates an additional VASR 181d which is used in relation to shared memory areas.

In one example embodiment of the ASAU 196, the target computing system 10 provides a number of different addressing modes. Most commonly available computing systems provide a 32-bit virtual addressing mode such that the virtual address space of a particular portion of program code is able to address $2^{32}$ individual elements (i.e. bytes, words) of the physical memory 18. Hence, many commercially available application programs expect to run in 32-bit virtual address spaces. However, some computing systems also allow larger addressing modes, such as a 64-bit mode, which can be used instead of or alongside the smaller 32-bit addressing mode. Conveniently, the translator unit 19 is set to run in the 64-bit addressing mode and is thereby provided with a 64-bit virtual address space (referred to below as the translator virtual address space or translator VAS 180). The address space allocation unit 196 then allocates a plurality of separate 32-bit virtual address space regions (VASR) 181 within the larger 64-bit translator VAS 180. Other addressing options are also available and can be applied in appropriate combinations to achieve the same effect, such as a 32-bit translator VAS which is subdivided to provide a plurality of 24-bit virtual address space regions.

The ASAU 196 is further arranged to direct each portion of target code 21 to a selected one or more of the VASR 181. As noted above with respect to FIG. 2, each portion of target code 21a is subdivided into a plurality of blocks 211 comprising a short sequence of individual instructions as a minimum unit handled by the translator 19. Some of these instructions make memory accesses such loads or stores and most of the instructions within a particular target code portion 21a access private memory with respect to the VASR 181a allocated to that portion. However, certain instructions or groups of instructions make memory accesses with respect to shared memory and are directed to access the VASR 181d for shared memory areas.

In one embodiment, the target code 21 is generated to refer to a base register BR 15a when performing memory operations. The base register 15a is a fast and readily available storage location for most architectures and can be used efficiently in "base plus offset" type memory accesses, but other suitable storage can be employed if appropriate. The base register BR is conveniently provided as part of the context information for this portion of target code (i.e. this thread or process). The base register BR 15a is used to store a base address giving a start address in the 64-bit translator VAS 180 as the start address of one of the 32-bit VASRs 181 to be used by the generated portion of target code 21. Each portion of target code 21a, 21b, 21c is then generated by the translator 19 to make memory accesses with reference to the start address in the base register BR 15a.

In the illustrated example of FIG. 8, for the target code portion 21a the base register BR contains the 64-bit value "$1<<32, 2^{32}$" whereby the thread T1 makes memory accesses referring to its allocated first (32-bit) VASR 181a as an offset from this 64-bit base value. Similarly, for the second target code portion 21b the base register BR contains the value "$2<<32, 2^{32}$" as the 64-bit start address of the second 32-bit VASR 181b.

Here, the example subject code 17 has been created to run in a 32-bit VAS and hence is concerned only with 32-bit addresses. The translator 19 accordingly generates the relevant portions of target code 21a-21b referring to 32-bit VASRs 181. However, since these 32-bit VASRs 181 are allocated from the larger 64-bit translator VAS 180, the target code uses the full 64-bit address when making memory accesses. This is achieved conveniently by concatenating a lower 32-bit address referring to the 32-bit VASR 181 with a full 64-bit base address specified in the base register BR 15*a*. For example, a target register r31 acts as the base register to hold the 64-bit base address and a target register r6 is used in the target code to hold a desired 32-bit address. The addresses are combined, as illustrated by the following pseudo code:

```
r6=0x00003210              ;a 32-bit address in the target code VASR
r31=0x00000001 00000000    ;a 64-bit base address for this VASR
add r3, r31, r6            ;combine the addresses into r3
lwz r5, 0(r3)              ;access memory using the combined
                            address in r3
```

Further, the ASAU 196 is arranged to direct certain instructions within the target code portion 21*a* to refer to a different one of the allocated VASRs 181. In particular, certain instructions which concern accesses to shared memory are directed to the VASR 181*d* reserved for shared memory areas.

In one example implementation, the start address given in the base register BR 15*a* is modified, such that subsequent instructions in the target code 21 then refer to a different one of the allocated VASRs 181. That is, the base address stored in the base register BR 15*a* is modified and the modified base address is then employed by the one or more subsequent instructions in a particular block of the target code, until the base register is reset to the previous value. Here, as in the example above, the value originally given in the BR 15*a* is "$1<<32,2^{32}$" as the 64-bit start address of the VASR 181*a* allocated to the first target code portion 21*a*. Temporarily changing the base address to "0" would, in the illustrated example, now cause the target code instructions to instead refer to the fourth VASR 181*d* reserved for shared memory areas. Returning BR15*a* to the value "$1<<32,2^{32}$" again causes the target code 21*a* to refer to the allocated first VASR 181*a*.

Conveniently, the default base address in the base register 15*a* is set as part of the context/state for this portion of target code 21*a*. Thus, the default value is readily available from the context and can be quickly set to the default value when needed, such as at the beginning of each target code block 211.

In another example implementation, the ASAU 196 is arranged to selectively generate target code instructions referring to at least two base registers 15*a*, 15*b* as also shown in FIG. 8. Conveniently the first base register BR1 holds a base address of the VASR 181*a*-181*c* allocated to the current portion of target code 21*a*-21*c*. Meanwhile, the second base register BR2 holds a base address of the VASR 181*d* allocated for shared memory areas. Here, target code instructions are generated to perform memory accesses relating to the first base register BR1 or the second base register BR2, or a combination of both. Thus, generating the first portion of target code 21*a* to refer only to the first base register BR1 throughout causes this portion of target code to operate solely with respect to the respective allocated VASR 181*a*. However, where the target code instructions instead refer to the base address in register BR2, then the target code is directed to access the VASR 181*d* for shared memory areas. By selectively planting references to the first and second base registers BR1, BR2, the ASAU 196 is arranged to control which VASR is accessed by the target code.

The SMDU 197 is arranged to detect a request by one of the portions of target code 21*a*, 21*b*, 21*c* to access a shared memory area. Firstly, this request may take the form of a request to initialise an explicit shared memory area that is to be shared with other threads or processes. Secondly, the request may take the form of an implicit request relating to shared memory, such as a request to access a memory area which is already mapped in the virtual address space of another thread. The detection of explicit shared memory will be discussed first, referring to FIG. 9. Then, the detection of implicit shared memory will be discussed in more detail referring also to FIG. 10.

As discussed above, the translator 19 is arranged to monitor and intercept the system calls made by the executing target code 21. In particular, x_calls are provided to pass execution control to the FUSE 194 in the translator 19 and thereby emulate the behaviour of memory mapping system calls such as mmap( ).

If the x_call does not relate to shared memory, then suitably a system call is made to the target OS to take action as required, such as loading a private non-shared page into the VASR 181 allocated to the executing portion of target code. Execution control then returns to the target code via the FUSE 194, and the target code receives context as if returning from the target system call.

However, where the x_call relates to shared memory, then action is taken by the shared memory detection unit 197. Here, the x_call, or at least information derived from the x_call, is passed to the SMDU 197. As a specific example, the target operating system 20 supports memory mapping system calls such as shmget or mmap( ). As a particular example in UNIX and LINUX type operating systems, the mmap( ) system call typically takes the form mmap (start, length, prot, flags, fd, offset) to request a mapping of length bytes starting at offset offset from the file or other object specified by the file descriptor fd into virtual memory at address start. For an anonymous file the argument fd is null. The argument prot describes the desired memory protection that sets read and write protections. The parameter flags includes, amongst others, the flag MAP_SHARED which explicitly shares this mapping with all other processes that map this object. Alternatively, the parameter flags includes the flag MAP_PRIVATE which creates a private copy-on-write mapping. Hence, the mmap( ) system call is planted in the target code as an equivalent x_call (e.g. x_mmap( )) and is able to explicitly request a private memory area, in which case a corresponding mmap( ) system call is passed to target OS 20 as noted above, or explicitly request a shared memory area, whereby action is taken by the SMDU 197.

Figure 9:
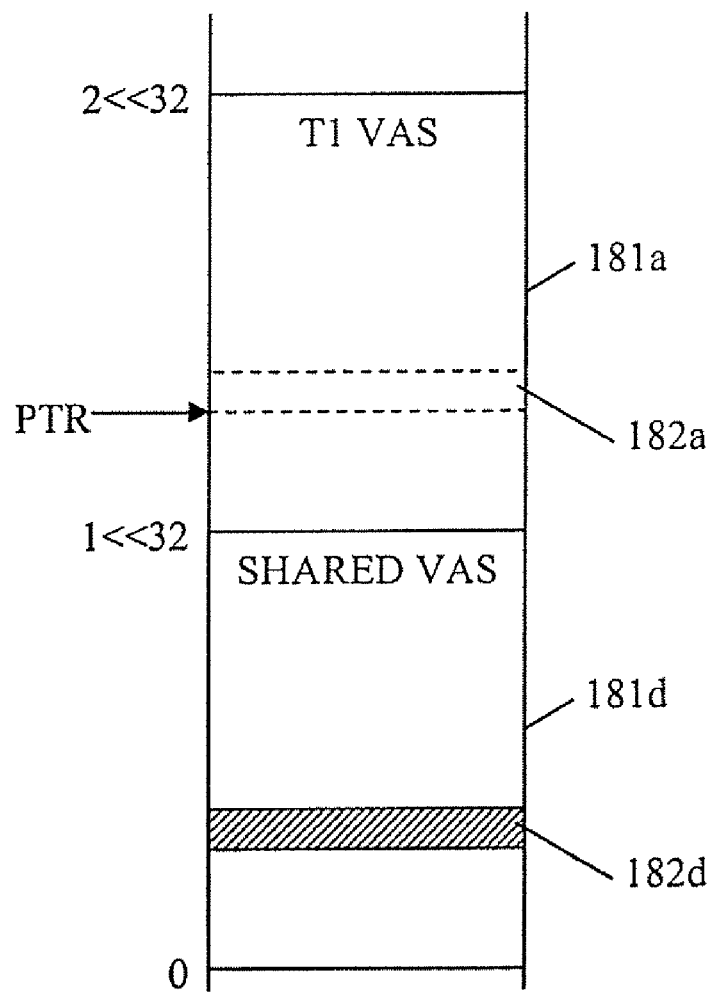
FIG. 9 is a schematic diagram showing part of a virtual memory layout.

FIG. 9 is a more detailed schematic view of the target computing system shown in FIG. 8, to illustrate the actions taken by the SMDU 197 in relation to a request to map explicit shared memory. In particular, FIG. 9 is a schematic representation of part of the translator VAS 180.

In this example shown in FIG. 9, the currently executing portion of target code 21*a* is a thread T1 which contains an x_mmap( ) system-like function call to request an explicitly shared memory area 182*a*. However, the requested shared memory area 182*a* is not mapped into the virtual address space region 181*a* associated with this particular thread T1 21*a*. Rather, a memory area 182*d* of the same size and offset as the requested shared memory area 182*a* is mapped instead into the virtual address space region 181*d* reserved for shared memory. A pointer PTR to the requested shared memory area is returned to the T1 target code 21*a* by the FUSE 194 as expected behaviour following a mmap( ) system call. In this exemplary embodiment, a 32-bit pointer is returned as a start address in the 32-bit VASR 181*a*. Execution of target thread T1 21*a* then continues as if a pointer had been given to a newly mapped shared memory area.

Optionally, the SMDU 197 records details of the requested shared memory area 182a derived from the arguments of the x_mmap( ) call. That is, the SMDU forms a mapping of each requested shared memory area 182, which conveniently includes the size and location of each shared memory area and may also identify a particular portion of target code as the owner or originator of this area. Also, the FUSE 194 and/or the SMDU 197 updates the subject state held in the translator 19 to reflect the manner in which this newly allocated shared memory region appears to the subject code 17.

Since the requested shared memory area 182a has not actually been mapped within the VASR 181a of the first target code thread T1 21a, when thread T1 attempts to access a page within the unmapped shared memory area 182a, an exception (i.e. a page fault) occurs. The exception is intercepted by the exception handler 195 as shown in FIG. 2 and passed to the SMDU 197, which thus is able to identify the block of target code that is attempting to access the explicit shared memory region 182a.

In response to this exception signal, the identified target code instruction is firstly directed to the VASR 181d reserved for shared memory and secondly the memory consistency protection mechanism is applied.

As discussed above, the ASAU 196 redirects at least certain instructions in the block of target code to the shared memory area 182d in the shared VASR 181d, by altering the code to amend the value in the base register BR 15a or by amending the code to refer instead to the second base register BR2 15b. The shared memory area 182d in the VASR 181d is mapped to the physical memory and thus the relevant instructions in the target code now obtain access to the shared memory area 182.

This exemplary embodiment readily enables the detection of an attempt to access the shared memory area 182 because the explicit shared memory area is not mapped within the virtual address space region 181 associated with the executing thread T1. However, by providing the additional virtual address space region 181d and redirecting selected target code instructions thereto, the desired shared memory region 182 is still accessible by the portion of target code 21.

Also, as will be discussed in more detail below, the MPU 198 applies the memory consistency protection mechanism to the identified target code instructions. That is, the memory consistency protection mechanism is applied selectively only for those blocks of target code 21 which attempt to access a shared memory region, to preserve memory consistency. Thus, relatively few instructions are affected. Notably, this mechanism does not need to apply the expensive memory protection mechanism to the whole program or even the whole thread.

Referring again to FIG. 8, it will be noted that the VASR 181d for shared memory areas does not overlap with the virtual address space region of any of the executing portions of target code T1, T2 or T3. Thus, any attempt by the second or third target code portions T2, T3 to access the explicitly shared memory area 182 will fail initially because the explicitly shared memory area is not mapped within the respective VASR 181b or 181c associated with that thread. Again, the resultant exception signal is handled by exception handler 195 and passed to the SMDU 197 which causes the relevant instructions to access the VASR 181d reserved for shared memory and have the memory consistency protection mechanism applied thereto. Hence, any target code instructions which attempt to access the explicit shared memory area are detected through the exception handler 195 and SMDU 197 and appropriate action is taken.

FIG. 10 is a more detailed schematic view of the target computing system shown in FIG. 8, to illustrate the actions taken by the SMDU 197 in relation to implicit shared memory. In particular, FIG. 10 is a schematic representation of part of the translator VAS 180 during the initiation of a new portion of target code, such as a new thread, to illustrate mechanisms to protect memory consistency when an implicit shared memory area is initiated at the beginning of a new portion of target code. In particular, FIG. 10 concerns a system call such as clone( ) in LINUX-type operating systems. Here, the normal system response is to create a child thread which runs concurrently with the parent process in the same shared virtual address space, where the child thread contains a subset of the context information from the parent process. Hence, a new thread created by a clone( ) system call will by default occupy the same virtual address space and thus share memory with a parent process. However, the response of the exemplary embodiments differs from this normal response as will now be described.

Figure 10A:
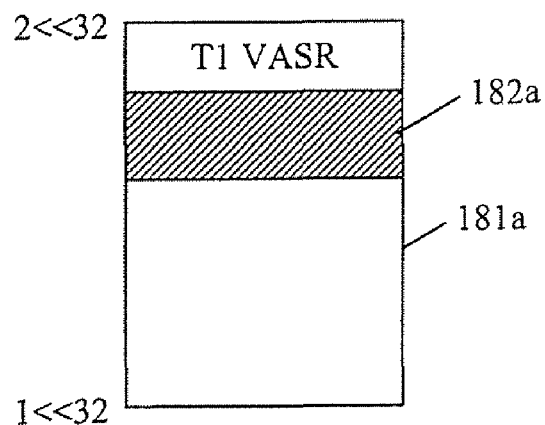
FIGS. 10A to 10D are schematic diagrams showing part of a virtual memory layout.
Figure 10B:
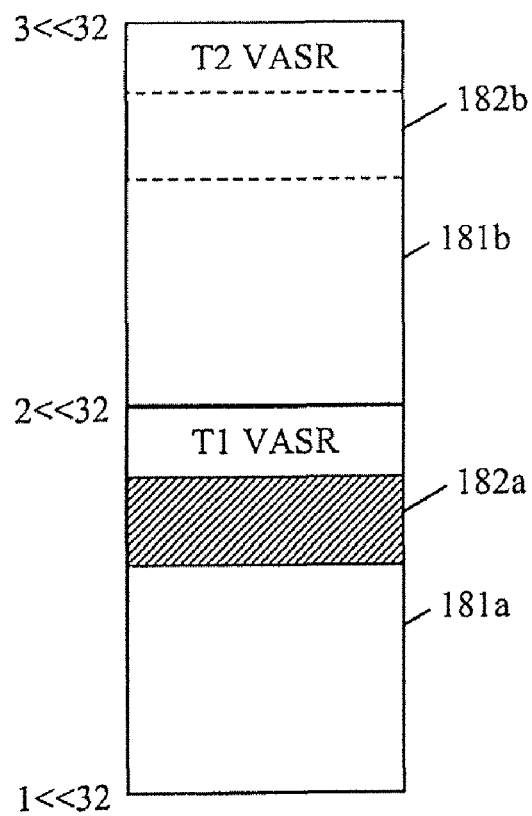

As shown in FIG. 10A, in this example a first thread T1 is executing in a first VASR 181a and has mapped in at least one memory area 182a as private to this process. Here, the mapped area 182a typically contains global data, initial heap memory and optionally additional heap memory. When the first thread T1 performs a clone( ) system call (conveniently planted as an x_call), a new thread T2 is allocated a separate VASR 181b using the ASAU 196 of FIG. 8. In this example, the base register 15a referenced by the new thread T2 21b contains the value "2<<32" such that the thread T2 is directed to the second VASR 181b. Since the two threads T1 and T2 are now allocated separate VASRs, the areas of memory 182a previously mapped in by thread T1 will not be mapped into the virtual address space region 181b associated with thread T2, as shown in FIG. 10B. Thus, an equivalent area 182b with a size and offset corresponding to the private mapped area 182a in VASR 181a remains unmapped in the second VASR 181b associated with thread T2.

As illustrated in FIG. 10B, thread T1 continues to access the private memory area 182a without, at this point, any changes to the portion of target code 21a of thread T1. This differs from the mechanism to handle explicit shared memory discussed above referring to FIGS. 8 and 9. Whilst thread T1 21a can still access the potentially shared memory area 182a, if thread T2 21b attempts to access the corresponding area 182b within its own VASR 181b the relevant pages are not mapped in and an exception will occur.

Figure 10C:
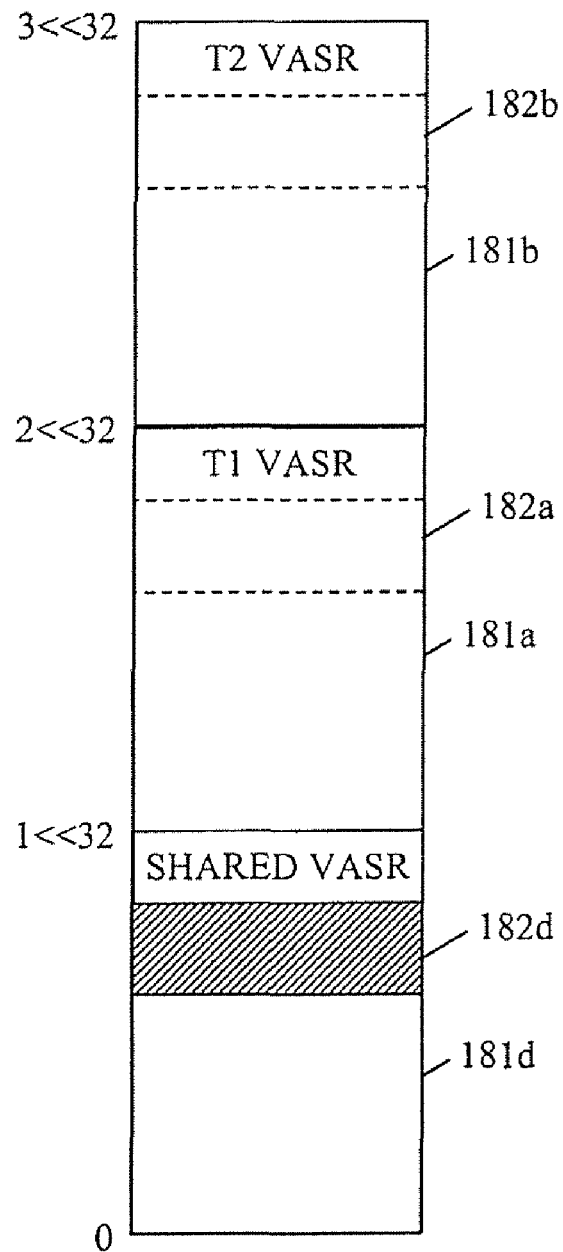

The exception signal is passed to the SMDU 197, which cooperates with the exception handler 195 to handle the exception. Firstly, the thread T1 is interrupted, because T1 owns the mapped in memory area 182a which the second thread T2 21b is attempting to access. Here, all pending accesses to the relevant memory area 182a from thread T1 are completed. Secondly, as shown in FIG. 10C, a corresponding memory area 182d of the same size and offset is now mapped in the shared VASR 181d such that the data in physical memory as referred to by the first thread T1 at area 182a is now available instead at the shared area 182d. A single page that faulted may be copied to the shared memory area 182d, or the entire relevant memory area 182a may now be copied. The shared area 182a which has been copied is now unmapped in the virtual address space region 181 of the first thread T1 21a such that the thread T1 can no longer access the area 182a, e.g. by using munmap( ) or by marking the area as protected.

T1 then notifies T2 that it is safe to retry the access in the newly created memory area 182d in the shared region 181d. T1 resumes normal execution. T2 now retries the memory access that faulted, this time by accessing the shared memory region 181d and with appropriate memory consistency protection applied, and then resumes execution.

As shown in FIG. 10C, if the target code portions T1 or T2 subsequently access the shared area 182 again (which is now non-accessible/unmapped in their private VASRs 181a, 181b), an exception will occur and the memory access will be completed instead through the exception handler 195 to access the shared address region 182d under the appropriate memory consistency protection applied by the MPU 198.

As a result of this mechanism, the appropriate instructions in the target code portions T1 and T2 are directed to the shared virtual address space region 181d to obtain access to the shared data area 182d and the stronger constraints of the second memory consistency model are applied to only for those parts of the target code which attempt to access the shared data area 182d.

The process now continues with threads T1 and T2 executing in parallel. Each time one of the threads, e.g. the second thread T2, attempts to access an area of memory which has already been mapped in by another thread, e.g. the first thread T1, an exception occurs which is handled to move the relevant area or page from the owner thread T1 into the shared VASR 181d and apply the memory consistency protection mechanism selectively to that area of target code. Any other thread which then attempts to access the now-shared memory area likewise causes an exception and the relevant code in that thread is likewise directed and subject to memory consistency protection. Thus, the mechanism applies to any number of portions of program code (threads T1, T2, T3 etc).

An alternative mechanism is to use a remapping system call as available in many Linux and UNIX type operating systems. Here, a MREMAP system call allows changes to a page table used by the target system 10 to control access to the memory 18. By changing the page table, a page of memory is mapped to a new position in the virtual address space 180 and is thus moved directly from the first VASR 181a to the second VASR 181b. The remapping occurs atomically from the point of view of the executing user-space threads and thus the first thread T1 does not need to be interrupted or notified.

Figure 10D:
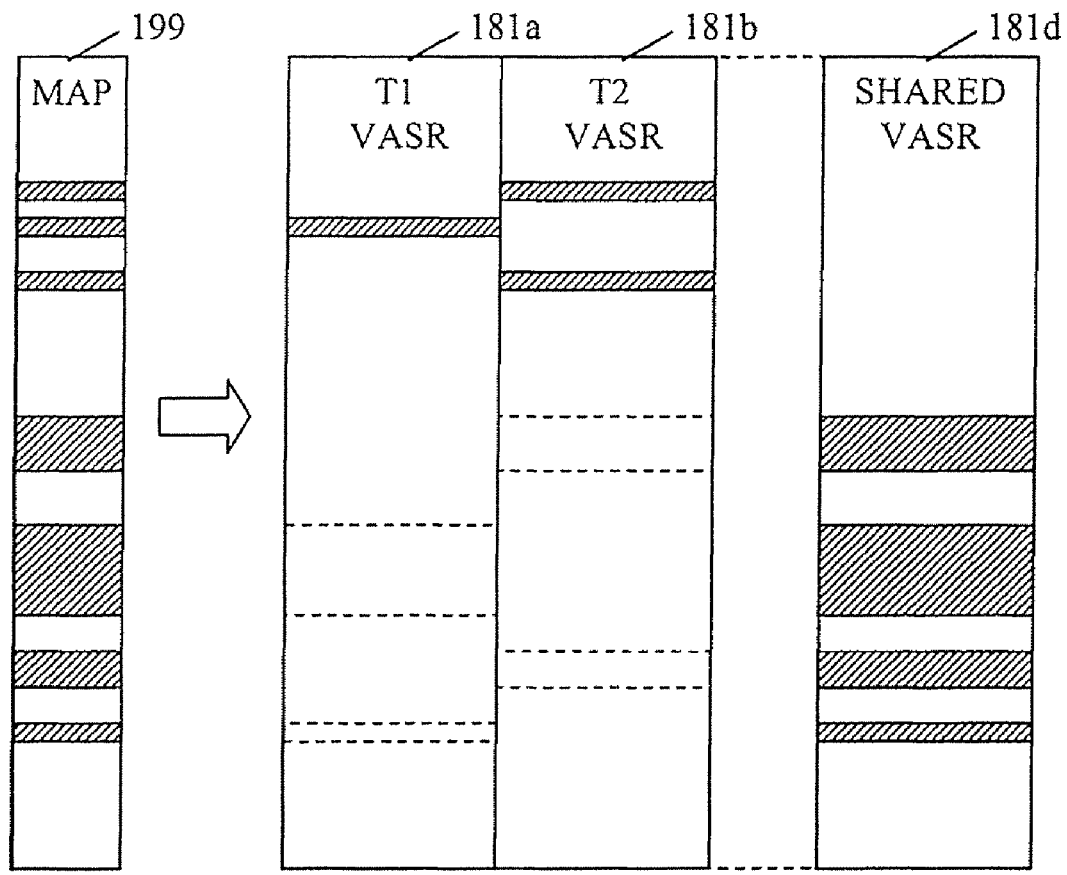

FIG. 10D is an another view of the translator VAS 180 showing the plurality of address space regions 181, but here the VASR 181 are shown aligned at their respective base addresses for ease of illustration. Also, FIG. 10D shows a VASR map 199 held by the SMDU 197 which records the mapped areas within each of the VASRs 181. In this exemplary embodiment, the VASRs are all of equal 32-bit size and a single 32-bit map conveniently records the mapped memory areas within each VASR. Hence, even though privately mapped areas initially reside in the VASR for one of the target code portions, implicit shared memory is readily detected by consulting the map 199 to determine that the requested 32-bit address in a particular VASR is already mapped at the corresponding position in another VASR. In response, the actions illustrated in FIGS. 10B and 10C are performed only for the target code instructions which access the detected shared memory areas.

The exemplary embodiments discussed herein exactly one VASR 181 for each of the target code portions 21a-21c. However, other embodiments are also possible and are contemplated as variations on the described exemplary embodiments. For example, more than one shared area may be provided. In one alternate embodiment, each target code portion 21a-21c is associated with a corresponding private VASR holding only private memory areas, and a respective shared memory area to hold shared memory areas and also one or more private memory areas. Here, the use of multiple VASRs for the plurality of target code portions still allows shared memory, and particularly implicit shared memory, to be detected easily by the SMDU 197.

Figure 11:
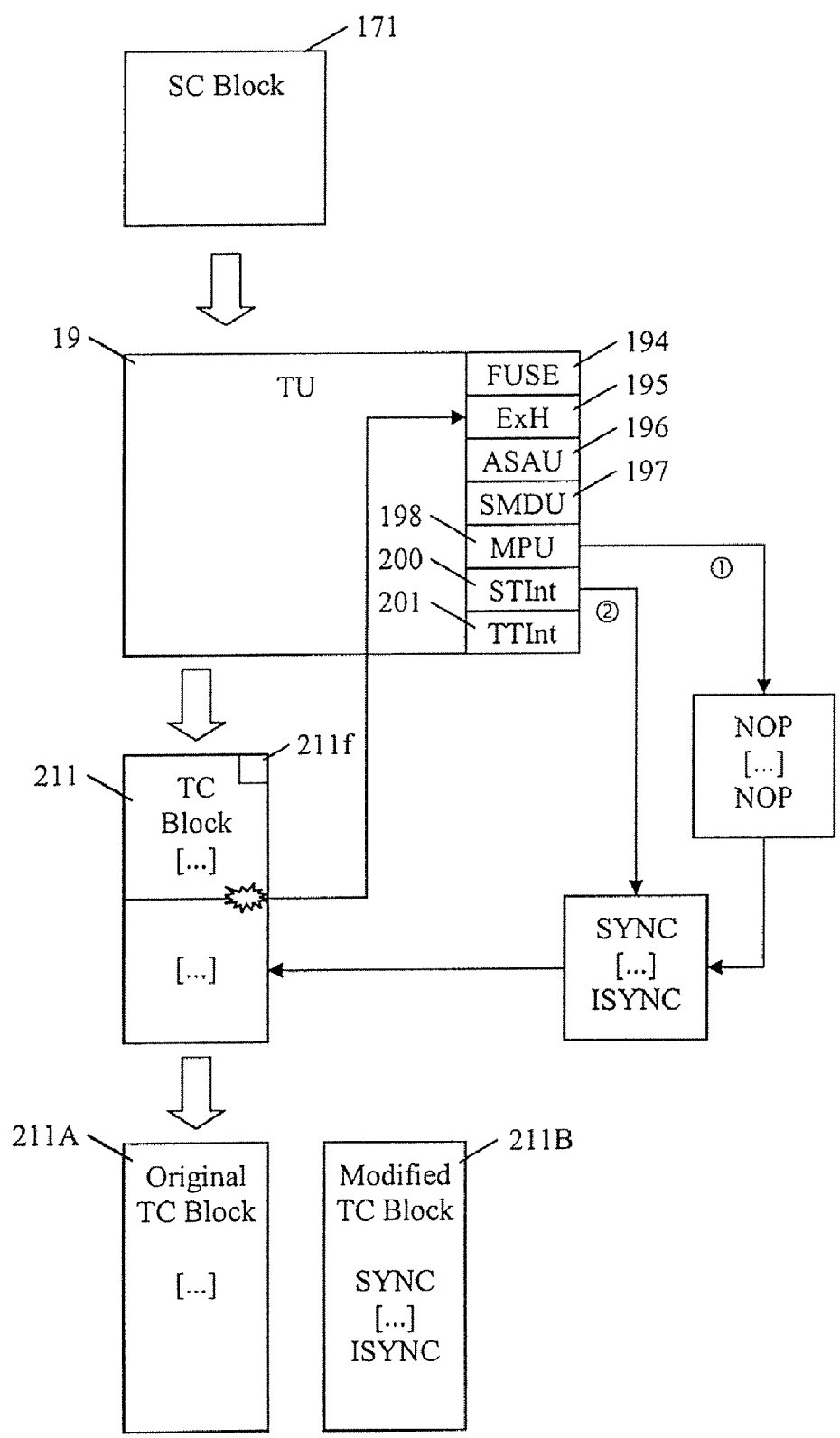
FIG. 11 is a schematic block diagram illustrating selected portions of the system in more detail.

FIG. 11 shows the exemplary embodiment of the memory consistency protection mechanism in more detail.

The example of FIG. 11 shows a subject code block 171 and a corresponding target code block 211. At some point during execution of the target code block 211, an exception occurs in relation to a shared memory area and, as discussed above, action is taken by the exception handler 195 in cooperation with the ASAU 196, the SMDU 197 and the MPU 198 to protect memory consistency. In the example of FIG. 11, the exception arises in relation to instructions part way through execution of this block and hence the block 211 has been divided into two halves for illustration, where the top half represents the instructions that have already been executed whilst a remainder in the bottom half have not yet begun execution. Here, the memory protection mechanism firstly attempts to complete execution of the current block 211 and measures are taken on the fly to protect memory consistency. Afterwards, when an appropriate settled state has been achieved, longer-term changes are made to the target code such as regenerating the entire block 211 with the aim of avoiding exceptions in future executions of this block of target code.

Looking firstly at the immediate measures taken by the memory consistency protection mechanism, various example embodiments will be described.

In one example embodiment (marked by ① in FIG. 11), the target code 21 is generated to include null operations at appropriate synchronisation points, e.g. between each pair of stores. These null operations, such as the NOP instruction in the IBM POWER ISA, have no effects other than to cause the processor to do nothing for a particular number of clock cycles and are hence convenient to use as placeholders. The null operations are now replaced with active serialisation instructions (e.g. SYNC and ISYNC) to apply the memory consistency safety net to the target code. Also, the code is modified to refer to the shared VASR 181d as discussed above. This embodiment thus at least partially modifies the non-executed part of the block 211 ready for future executions.

In another embodiment (marked by ② in FIG. 11), execution of the block of target code is completed through a subject-to-target interpreter STInt 200 which resides within or is associated with the MPU 198. That is, execution is completed by interpreting the remaining instructions of the corresponding subject code block 171b instruction by instruction through the STInt 200 into equivalent target code instructions. Here, the MPU 198 causes the interpreter to apply serialisation instructions to form appropriate synchronisation points (e.g. inserting SYNC and ISYNC following loads or stores). However, this embodiment assumes that an appropriate subject state is available, in order to begin execution through the STInt 200.

In yet another embodiment, at least the unexecuted part of the target block is immediately regenerated to insert the serialisation instructions. That is, the remaining part of the target code block 211 is replaced by a modified version wherein serialisation instructions are inserted at the determined synchronisation points. Again, this embodiment assumes that a suitable subject state is available such that the regenerated target code may again move forward from a known state.

Where an appropriate subject state is not available at point where the exception occurred, the MPU 198 suitably rolls back in the target code to reach a checkpoint or recovery point at which the required subject state is achievable. An example mechanism to achieve subject state in relation to an exception is discussed in detail in WO2005/006106 cited above. Here, checkpoints are provided such as the beginning or end of a block or at selected points within a block. The MPU seeks the last reached checkpoint and is thus able to recover the subject state at that checkpoint. Execution of the block is now completed by going forward from the checkpoint with reference to the recovered subject state.

In a further refinement, the MPU 198 rolls forward to a next checkpoint subsequent to the point at which the exception occurred. Here, the MPU is assisted by a target-to-target interpreter TTInt 201 which interprets the already generated target code in the block 211 whilst inserting appropriate serialisation instructions to protect memory consistency, until the target code rolls forward to the next checkpoint. This forward rolling mechanism to recover subject state is discussed in detail in WO2006/103395. As a further refinement, the target-to-target interpreter TTInt 201 gathers translation hints during the roll-forward operation, such as recording those memory accesses which faulted and those which did not, in order to improve a later regeneration of that block of target code. Conveniently, these translation hints are implanted into the target code by initially generating the target code with NOP null operations and then selectively replacing the NOPs with translation hint flags.

Having dealt with the immediate needs of this target code block 211, the translator 19 may now devote further attention to the block 211. For example, all or part of the entire target block 211 is regenerated, such as to include the serialisation instructions (e.g. SYNCs and ISYNCs) throughout the block or to protect selected groups of instructions within the block. Thus, the regenerated target code block 211$b$ is now subject to memory consistency protection in relation to shared memory accesses when that block is executed in future. The regeneration of the target code may employ translation hints gathered from execution of the previous incarnation of the block of target code. The regeneration can be performed immediately or can be deferred until a later point, such as when the block 211$b$ is next needed for execution, by marking the block as requiring regeneration using a regeneration flag 211$f$ as shown schematically in FIG. 11. The regeneration process may be iterative and take several passes. That is, the memory consistency protection is applied selectively to a first group of instructions after a first regeneration, and then is also applied to a second group of instructions in a second regeneration. Here, the translation hints gathered from the previous one or more incarnations may be used to assist the latest iteration of the regeneration. Further, the regeneration process may include the combination of two or more basic blocks of target code to from a group block having more than one unique entry point and/or more than one unique exit point and/or having internal jumps. Here, the translation hints embedded in the target code are helpful in allowing the translator to form an efficient group block which already takes account of the previous regenerations of the relevant basic blocks and so reduces regenerations of the group block.

In practical implementations, a particular section of code may be used to access both shared and private memory. As discussed above, the target code is originally generated appropriate to private memory in the relevant private VASR 181$a$-$c$. If the code is then retranslated appropriate to shared memory, it will now instead cause an exception when attempting to access private memory because the private memory is not mapped within the shared VASR 181$d$. One option is therefore to translate the code again back to the original format appropriate to private memory. The mutually exclusive nature of the memory pages being mapped either to the shared VASR 181$d$ or the private VASR 181$a$-$c$ ensures that this change of case is always detected.

There is an overhead in handling the exception and retranslating the relevant block or blocks of code. In some programs, the retranslation overhead is encountered relatively infrequently and hence is the most appropriate overall solution. However, it has also been found that some instances involve frequent retranslations, such as when a section of code is called from many different sites within a program. One particular example is the memory copy function memcpy( ). Here, the mechanism has been further developed and refined to address this issue.

As shown in FIG. 11, the translator 19 may retain at least two different versions of the target block 211. A first version 211A is the original translation without memory consistency protection, which executes quickly according to the reordering and other optimisations performed by the target system. The second version 211B is subject to the memory consistency protection, in this example referring to the shared VASR 181$d$ with serialisation instructions, and hence executes more slowly. The translator may now selectively execute either the first or second version 211A or 211B when this block is next encountered during execution of the program. On entry to a function, a dynamic test is applied to determine the type of memory being accessed, i.e. either private or shared, and the appropriate version then selected. Whilst this solution reduces translation overhead, there is an execution penalty in performing the dynamic test.

In another refinement, the translator performs a loop optimisation. Here, a loop is executed for the first time and causes a memory exception because a memory access within the loop refers to shared memory. The translator may now retranslate the code in the loop to refer to shared memory, such that future executions referring to shared memory are less likely to fault. Providing a dynamic check specialises the code in the loop to either access private or shared memory. Also, the translator may attempt to hoist the dynamic check out of the loop and place it before the loop, thus further reducing execution workload.

As an alternative to dynamically checking the called code, another option is to inline the specialised code at the caller site. Another option is to specialise callers to a particular function. That is, a caller is specialised to call either private-type or shared-type accessor function to access private or shared memory respectively. For example:

Caller>memcopy>memory

Becomes:

Caller1(private)>memcopy_private>private memory
Caller2(shared)>memcopy_shared>shared memory These specialised callers may also involve further layer of indirection (i.e. wrapper functions as extra items on a call stack). Here, the memory address to be accessed is determined by the caller, and the memory address is only used by the accessor function (e.g. memcopy). The wrapper functions are initially set to call a private version of their successor. Hence, inspecting the call stack determines the wrapper functions which need to be specialised in order to allow future calls from this caller site to succeed. Suitably, progressive specialisation adapts one wrapper layer at a time, starting closest to the accessor function, until each layer has been specialised into private and shared versions.

Figure 12:
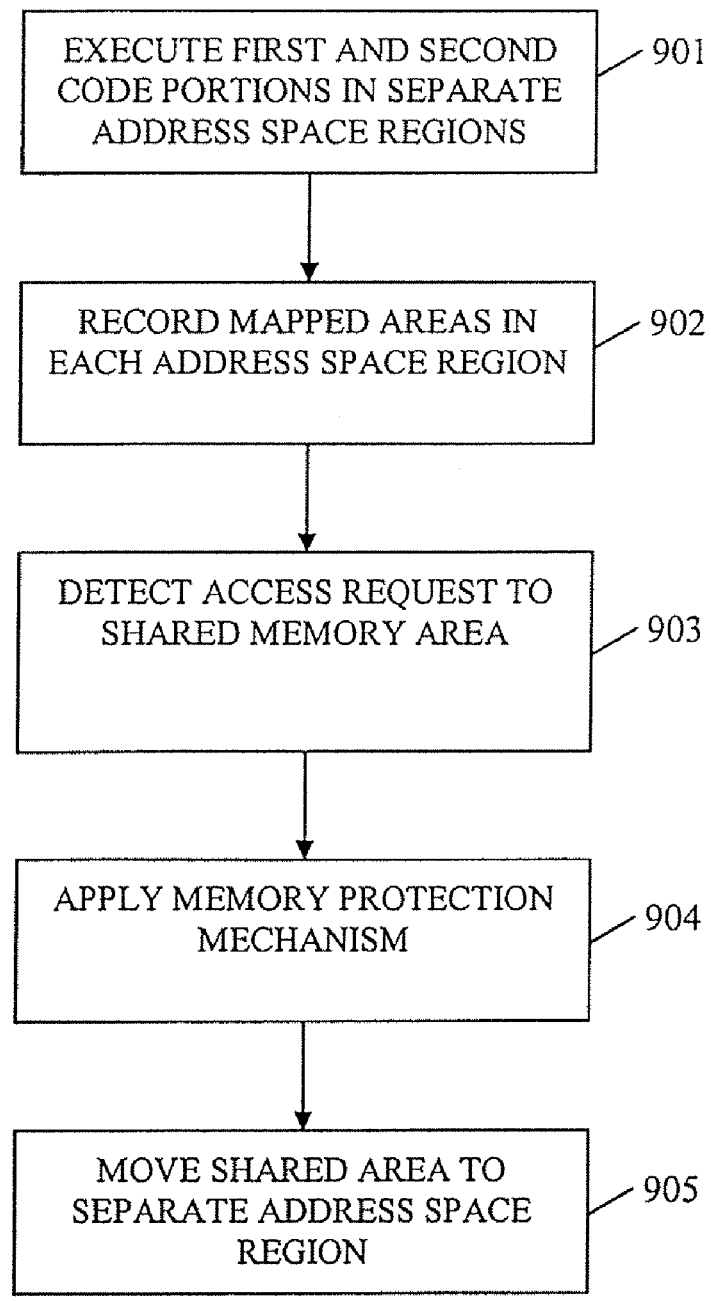
FIG. 12 is a schematic flow diagram of a method to provide memory consistency protection in an exemplary embodiment of the present invention.

FIG. 12 is a schematic flow diagram to provide a general overview of the memory consistency protection method as a summary of the various detailed embodiments discussed herein.

At step 901, first and second code portions are executed in separate virtual address space regions. For example, the first and second target code portions 21$a$, 21$b$ execute with respect to distinct and non-overlapping first and second virtual address space regions 181a, 181b respectively.

Step 902 optionally comprises recording mapped areas 182a, 182b within each of the virtual address space regions 181a, 181b. Here, the address offset and size (address range) of each mapped memory area is recorded in a memory map 199 in response to a memory mapping action, such as a mmap( ) system call amongst others.

At step 903, the method comprises detecting an access request to a memory area which is unmapped in the address space associated with the currently executing code portion, but which is mapped in another of the plurality of address spaces. Here, the corresponding memory area is mapped either in the address space associated with another executing code portion (i.e. another thread) or in a separate address space reserved for shared memory. In either case, the access request by the currently executing code portion causes a memory exception and, in response to the memory exception, it is determined that the currently executing code portion is attempting to access a shared memory area.

At step 904, the method comprises amending the currently executing code to apply a memory consistency protection mechanism which causes the code to execute under a memory consistency model having predetermined constraints. Also, the currently executed code is amended to be directed to the predetermined shared memory area in the address space reserved for shared memory.

Finally, at step 905, where the shared memory area is not already residing within the address space reserved for shared memory, the shared memory area is moved into such address space and is unmapped or otherwise protected at least in the address space associated with the current code portion.

Considering mechanisms to initiate a new executing code portion such as the clone( ) system call discussed above, it will be appreciated that the step 901 may further include the steps of detecting such an attempt to initiate a newly executing code portion, allocating a separate address space for the new executing code portion and then executing the new code portion in the newly allocated separate address space.

It will also be appreciated that the steps illustrated in FIG. 12 need not be performed in the sequential order shown. As a particular example, it will be appreciated that the step 902 of recording the mapped areas in each address space may be performed dynamically as each new area of memory is mapped in to a particular address space, which will occur before, in parallel with, or after, the step 901 of executing the plurality of code portions each in separate address spaces. Further, the steps 904 and 905 may optionally be performed predictively, such that target code is first generated having the memory consistency protection mechanism applied thereto. These alternative implementations may depend upon settings within the translator 19. Where the translator predicts that, as a result of converting the subject code 17, such optional implementations would be beneficial for a particular section of the program, then the memory consistency protection mechanism is applied to the generated target code 21.

It will further be appreciated that the mechanisms discussed above are not limited to the processes and threads operating within a single application program, but may also be applied to a set or suite of programs operating simultaneously on the target computing system. That is, two or more separate programs (tasks) may operate together in a manner which shares memory under the mechanisms discussed above.

Figure 13:
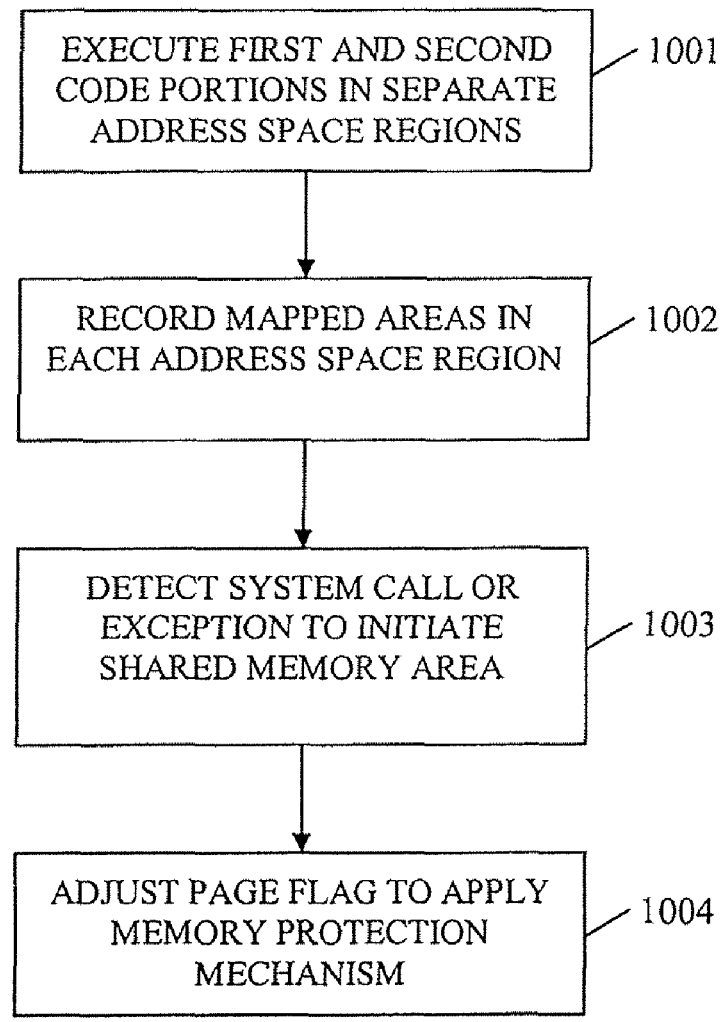
FIG. 13 is a schematic flow diagram of a method to provide memory consistency protection in another exemplary embodiment of the present invention.

FIG. 13 is a schematic flow diagram of a method to implement the memory consistency protection mechanism in the MPU 198 according to another embodiment of the present invention. The memory consistency protection mechanism discussed above in detail applied serialisation instructions to the generated target code. In an alternative arrangement, a page flag modification is employed on certain architectures of the target computing system to create store-ordered pages in the memory 18.

In step 1001, the plurality of target code portions each execute in separate virtual address space regions, similar to the embodiment discussed above. At step 1002, the method comprises recording the memory areas mapped into each of the plurality of address spaces such as by using the VASR map 199 of FIG. 10D. These steps are suitably performed by the ASAU 196 of FIG. 11 in the manner discussed above.

At step 1003, the method comprises detecting a request to initiate a shared memory area. In one particular embodiment this request is a memory mapping system call such as mmap( ) which explicitly requests shared memory. In another example, an exception is raised when a child thread attempts to access a region which is unmapped in its own address space but which is mapped within the address space of a parent thread, where the child thread has been generated such as by a clone( ) system call. Suitably, the detection mechanisms of the SMDU 197 are employed as discussed above.

At step 1004, the page or pages of the detected shared memory area are marked by the MPU 198 by manipulating page table attributes such that accesses to these pages are forced to adhere to the second, non-default memory consistency model. As a specific example, an implementation of system hardware based on a PowerPC architecture is adapted to allow the relevant pages to be marked as requiring sequential consistency.

This embodiment advantageously does not require the shared memory area 182 to be moved to a separate address space region 181. Instead, the shared memory area 182 is mapped into the VASR 181a, 181b, 181c of each target code portion 21a, 21b, 21c which requires access to the shared memory area 182. Any code accessing the shared area will do so in a store-ordered manner and thus the desired memory consistency model is applied. Further, the target code will access the shared memory area 182 without a page fault and modification of the target code is avoided.

FIG. 14 is a schematic view of parts of the target computing system including the translator VAS 180 to further illustrate this example embodiment relating to store-ordered pages, together with a page table PT 183 which maps the virtual address space 180 to the physical memory subsystem 18.

Figure 14A:
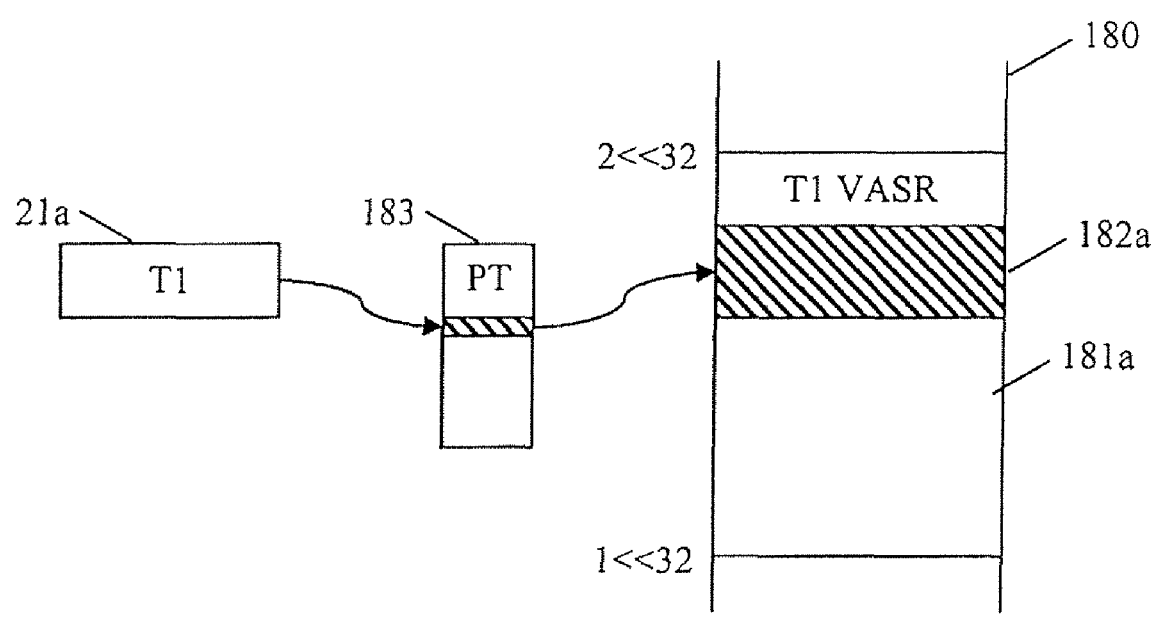
FIGS. 14A and 14B are schematic diagrams illustrating selected portions of the program code conversion system in more detail.

In FIG. 14A, the first code portion T1 21a induces a mmap( ) type system call which explicitly requests shared memory, e.g. file-backed mmap_shared memory. The FUSE 194 in the translator unit 19 intercepts the system call and, if the page is not already marked as store ordered, invalidates cache lines for the region and marks the page as store-ordered in the page table PT 183. The file is then mapped into the VASR 181a of the first code portion T1 21a as a shared memory area 182a.

Figure 14B:
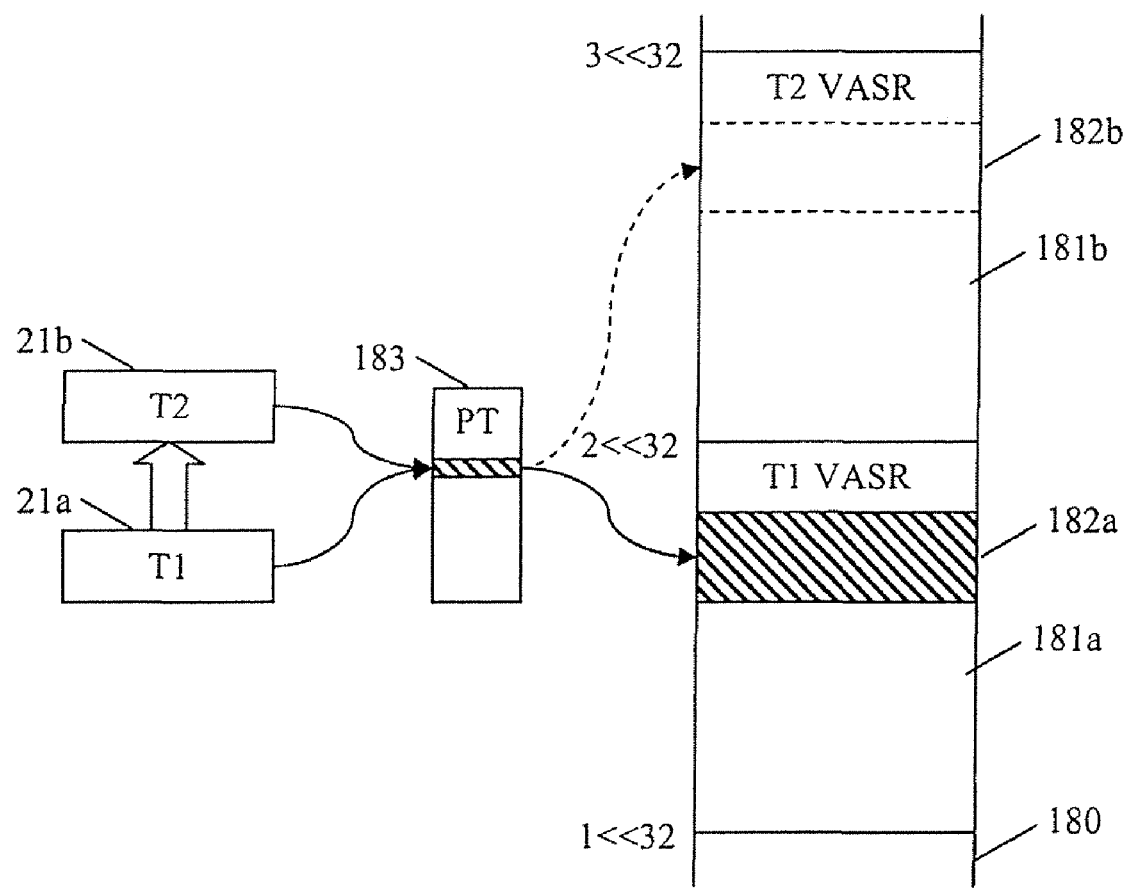

As shown in FIG. 14B, where a second target code portion 21b now attempts to access the shared memory area 182a, an exception will be raised because the shared memory area is not currently mapped in the relevant VASR 181b. In response, the SMDU 197 now maps the shared memory area 182b also into the second VASR 181b and, where not already so marked, marks the relevant memory pages as store-ordered by manipulating the page table attributes.

FIG. 14B also illustrates the response of the system if a clone( ) system call occurs. The new thread in code portion 21b is allocated a separate and distinct VASR 181b which does not overlap with the VASR 181a of the parent process 21a. In this case, a previously private memory region 182a in the first VASR 181a of the first code portion 21a may now become shared. Even though certain regions of memory 182a will be already mapped within the VASR 181a parent process, these remain unmapped for the newly cloned thread. If the second code portion 21b now attempts to access a memory region 182b which is unmapped in its own VASR 181b but which is mapped at a corresponding area 182a in the VASR 181a of the parent process 21a, then the child thread T2 21b will cause an exception. The SMDU 197 maps the desired file into the VASR of the child thread to map in the shared memory area 182b to the same relative position in both of these VASRs 181a, 181b to provide both portions of target code 21a, 21b access to the same page of the physical memory. In this case, the previously private but now implicitly shared memory area 182 is marked as store ordered in the page table PT183.

The example embodiments have been discussed above mainly in relation to a program code conversion system for acceleration, emulation or translation of program code. Also, the mechanisms discussed herein are applicable to a debugging tool which detects, and optionally automatically corrects, program code that is vulnerable to memory consistency errors. Design problems or bugs are difficult to find, isolate and correct in shared memory multiprocessor architectures. Undetected bugs result in improper operations that often lead to system failures and that delay new software releases or even require post-release software updates. To this end, the controller/translator unit here is configured to run as a debugging tool to detect shared memory areas and apply appropriate code modifications to the subject code such as inserting serialisation instructions or modifying page table attributes, such that the generated target code is debugged.

Although a few example embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computing system, comprising:
  a plurality of processors; and
  a translator unit arranged to receive subject code configured to run on a subject computing system according to a first memory consistency model and generate corresponding target code for execution as a plurality of program threads on any of the plurality of processors, the translator unit comprising:
    a shared memory detection unit arranged to detect a request by a program thread to access a shared memory area; and
    a memory consistency protection unit arranged to selectively apply a second memory consistency model to identified instructions in the program thread in relation to accesses to the shared memory area.

2. The system of claim 1, wherein the translator unit further comprises an address space allocation unit arranged to divide a virtual address space that addresses a memory into a plurality of virtual address space regions and to control execution of the plurality of program threads to access the memory through the plurality of virtual address space regions.

3. The system of claim 2, wherein the address space allocation unit is arranged to allocate a virtual address space region for addressing the shared memory area and to control execution of the plurality of program threads to access the shared memory area through the allocated virtual address space region for the shared memory area.

4. The system of claim 1, wherein the memory consistency protection unit regenerates selected portions of the identified instructions of the program thread to include synchronisation instructions.

5. The system of claim 1, wherein the memory consistency protection unit regenerates selected portions of the identified instructions of the program thread to force selected store-ordered pages in a memory.

6. The system of claim 2, wherein the target code is generated to refer to a base register, wherein a base address stored in the base register refers to one of the virtual address space regions.

7. The system of claim 6, wherein the address space allocation unit is arranged to modify the base address stored in the base register to control references to different ones of the virtual address space regions.

8. The system of claim 2, wherein the target code is generated to refer to at least two base registers, wherein one of the two base registers holds a base address referring to a virtual address space region allocated to a shared memory area.

9. A method, comprising:
  receiving subject code configured to run on a subject computing system according to a first memory consistency model;
  generating corresponding target code from the subject code for execution as a plurality of program threads on any of a plurality of processors of a target computing system, wherein generating the target code comprises:
    detecting a request by a program thread to access a shared memory area; and
    selectively applying a second memory consistency model to identified instructions in the program thread in relation to accesses to the shared memory area.

10. The method of claim 9, further comprising:
  dividing a virtual address space that addresses a memory into a plurality of virtual address space regions; and
  controlling execution of the plurality of program threads to access the memory through the plurality of virtual address space regions.

11. The method of claim 10, further comprising:
  allocating a virtual address space region for addressing the shared memory area; and
  controlling execution of the plurality of program threads to access the shared memory area through the allocated virtual address space region for the shared memory area.

12. The method of claim 9, wherein generating the target code further comprises regenerating selected portions of the identified instructions of the program thread to include synchronisation instructions.

13. The method of claim 9, wherein generating the target code further comprises regenerating selected portions of the identified instructions of the program thread to force selected store-ordered pages in a memory.

14. The method of claim 10, further comprising generating the target code to refer to a base register, wherein a base address stored in the base register refers to one of the virtual address space regions.

15. The method of claim 14, wherein generating the target code further comprises modifying the base address stored in the base register to control references to different ones of the virtual address space regions.

16. The method of claim 10, further comprising generating the target code to refer to at least two base registers, wherein one of the two base registers holds a base address referring to a virtual address space region allocated to a shared memory area.

17. A computer program product, comprising:
a computer-readable storage medium having computer readable program code embodied therewith, the computer readable program code comprising computer readable program code configured to translate subject code configured to run on a subject computing system according to a first memory consistency model into target code for execution as a plurality of program threads on any of a plurality of processors of a target computing system, wherein the computer readable program code is configured to:
detect a request by a program thread to access a shared memory area; and
selectively apply a second memory consistency model to identified instructions in the program thread in relation to accesses to the shared memory area.

18. The method of claim 17, wherein the computer readable program code is configured to:
divide a virtual address space that addresses a memory into a plurality of virtual address space regions; and
control execution of the plurality of program threads to access the memory through the plurality of virtual address space regions.

19. The method of claim 18, wherein the computer readable program code is configured to:
allocate a virtual address space region for addressing the shared memory area; and
control execution of the plurality of program threads to access the shared memory area through the allocated virtual address space region for the shared memory area.

20. The method of claim 17, wherein the computer readable program code is configured to regenerate selected portions of the identified instructions of the program thread to include synchronisation instructions.

21. The method of claim 17, wherein the computer readable program code is configured to regenerate selected portions of the identified instructions of the program thread to force selected store-ordered pages in a memory.

22. The method of claim 18, wherein the computer readable program code is configured to generate the target code to refer to a base register, wherein a base address stored in the base register refers to one of the virtual address space regions.

23. The method of claim 22, wherein the computer readable program code is configured to modify the base address stored in the base register to control references to different ones of the virtual address space regions.

24. The method of claim 18, wherein the computer readable program code is configured to generate the target code to refer to at least two base registers, wherein one of the two base registers holds a base address referring to a virtual address space region allocated to a shared memory area.

25. A computing system, comprising:
a memory storing a program, the program executable on a subject computing architecture according to a first memory consistency model;
a plurality of processors arranged to execute the program on any of the plurality of processors as a plurality of program threads;
a shared memory detection unit arranged to detect a request by a program thread to access a shared memory area of the memory and identify at least one group of instructions in the program thread which access the shared memory area; and
a memory consistency protection unit arranged to selectively apply a second memory consistency model to the identified group of instructions in relation to accesses to the shared memory area.

26. The computing system of claim 25, further comprising an address space allocation unit arranged to divide a virtual address space that addresses the memory into a plurality of virtual address space regions and to control execution of the plurality of program threads to access the memory through the plurality of virtual address space regions.

27. The system of claim 26, wherein the address space allocation unit is arranged to allocate a virtual address space region for addressing the shared memory area and to control execution of the plurality of program threads to access the shared memory area through the allocated virtual address space region for the shared memory area.

28. A translator unit for generating target code executable as a plurality of program threads on any of a plurality of processors of a target computing system from subject code configured to run on a subject computing system according to a first memory consistency model, the translator unit comprising:
a shared memory detection unit arranged to detect a request by a program thread to access a shared memory area of the target computing system and identify at least one group of instructions in the program thread which access the shared memory area; and
a memory consistency protection unit arranged to selectively apply a second memory consistency model to the identified group of instructions in relation to accesses to the shared memory area.

29. The translator unit of claim 28, further comprising an address space allocation unit arranged to divide a virtual address space that addresses a memory into a plurality of virtual address space regions and to control execution of the plurality of program threads to access the memory through the plurality of virtual address space regions, at least one of the virtual address space regions allocated to addressing the shared memory area.

* * * * *